(12) United States Patent
Gupta et al.

(10) Patent No.: US 11,243,540 B2
(45) Date of Patent: Feb. 8, 2022

(54) SYSTEM AND METHOD FOR COMPLETE COVERAGE OF UNKNOWN ENVIRONMENTS

(71) Applicant: University of Connecticut, Farmington, CT (US)

(72) Inventors: Shalabh Gupta, Manchester, CT (US); Junnan Song, Vernon, CT (US)

(73) Assignee: University of Connecticut, Farmington, CT (US)

( * ) Notice: Subject to any disclaimer, the term of this patent is extended or adjusted under 35 U.S.C. 154(b) by 105 days.

(21) Appl. No.: 16/412,038

(22) Filed: May 14, 2019

(65) Prior Publication Data

US 2019/0354106 A1 Nov. 21, 2019

Related U.S. Application Data

(60) Provisional application No. 62/673,090, filed on May 17, 2018.

(51) Int. Cl.
  *G05D 1/02* (2020.01)
  *G05D 1/00* (2006.01)

(52) U.S. Cl.
  CPC ......... *G05D 1/0212* (2013.01); *G05D 1/0088* (2013.01); *G05D 1/0268* (2013.01); *G05D 2201/0213* (2013.01)

(58) Field of Classification Search
  CPC .. G05D 1/0212; G05D 1/0088; G05D 1/0268; G05D 2201/0213

(Continued)

(56) References Cited

U.S. PATENT DOCUMENTS 7,805,220 B2 * 9/2010 Taylor .................. G05D 1/0219
  700/253
7,953,551 B2 * 5/2011 Park ...................... G01C 21/20
  701/416

(Continued)

FOREIGN PATENT DOCUMENTS

WO 2016161097 A1 10/2016
WO 2017123137 A1 7/2017

OTHER PUBLICATIONS

Choi et al. (2017) B-Theta: an Efficient Online Coverage Algorithm for Autonomous Cleaning Robots. J Intell Robot 3yst. 87:265-290) (Year: 2017).*

(Continued)

*Primary Examiner* — Yazan A Soofi
(74) *Attorney, Agent, or Firm* — McDonnell Boehnen Hulbert & Berghoff LLP

(57) ABSTRACT

Methods and apparatus related to autonomous vehicles (AVs) are provided. A mapping can be determined that tiles an environment having an AV using a plurality of cells; each cell having an environmental status. While the AV is in the environment: status data can be received relating to a location of the AV and obstacles at that location; environmental status for a cell can be updated based on the status data; a value for each cell can be determined based on the cell's environmental status; a waypoint of a coverage path that covers a region in the environment and is based on the AV's location can be determined; a determination whether the waypoint is reachable from the AV's location can be made; after determining that the waypoint is reachable, a command based on the mapping can be sent directing the AV toward the waypoint; and the waypoint can be updated.

20 Claims, 13 Drawing Sheets

(58) Field of Classification Search
USPC .......................................................... 701/23
See application file for complete search history.

(56) References Cited

U.S. PATENT DOCUMENTS

| | | | |
|---|---|---|---|
| 8,463,436 B2 | 6/2013 | Jeong et al. | |
| 8,483,881 B2 | 7/2013 | Ermakov et al. | |
| 8,825,388 B2* | 9/2014 | Khorashadi | H04W 4/029 |
| | | | 701/434 |
| 8,903,589 B2 | 12/2014 | Sofman et al. | |
| 8,948,913 B2* | 2/2015 | Choi | G05D 1/0274 |
| | | | 700/245 |
| 9,014,848 B2* | 4/2015 | Farlow | B25J 11/009 |
| | | | 700/245 |
| 9,242,378 B2* | 1/2016 | Matsumoto | G05D 1/0274 |
| 9,298,183 B2 | 3/2016 | Artes et al. | |
| 9,402,518 B2 | 8/2016 | Burlutskiy | |
| 9,408,514 B1 | 8/2016 | Alexander et al. | |
| 9,408,515 B2 | 8/2016 | Rosenstein et al. | |
| 9,436,185 B2 | 9/2016 | Schnittman | |
| 9,538,702 B2 | 1/2017 | Balutis et al. | |
| 9,565,984 B2 | 2/2017 | Lu et al. | |
| 9,678,509 B2 | 6/2017 | Sofman et al. | |
| 9,796,088 B2* | 10/2017 | Hong | B25J 5/00 |
| 2006/0237037 A1 | 10/2006 | Kim | |
| 2009/0088916 A1* | 4/2009 | Elgersma | G05D 1/106 |
| | | | 701/23 |
| 2012/0010772 A1* | 1/2012 | Pack | G05D 1/0274 |
| | | | 701/27 |
| 2016/0100522 A1* | 4/2016 | Yamauchi | A01D 34/008 |
| | | | 701/25 |
| 2018/0267540 A1* | 9/2018 | Sonoura | G05D 1/0221 |
| 2019/0286145 A1* | 9/2019 | LaFary | G05D 1/024 |

OTHER PUBLICATIONS

Acar et al. (2002) Sensor-based Coverage of Unknown Environments: Incremental Construction of Morse Decompositions. Int Jour Robot Researsh. 21:345.
Acar et al. (2003) Path Planning for Robotic Demining: Robust Sensor-based Coverage of Unstructured Environments and Probabilistic Methods. Int Jour Robot Research. 22(7-8)441-466.
Acar et al. (2002) Morse Decompositions for Coverage Tasks. Int Jour Robot Research. 21(4)331-344.
Choi et al. (2017) B-Theta:an Efficient Online Coverage Algorithm for Autonomous Cleaning Robots. J Intell Robot Syst. 87:265-290.
Diluna et al. (2017) Turing Mobile: A Turing Machine of Oblivious Mobile Robots with Limited Visibility and its Applications. Turing Mobile.
Gabriely et al. (2003) Competitive on-line coverage of grid environments by a mobile robot. Comput Geom. 24:197-224.
Gonzalez et al., (2005) BSA: A Complete Coverage Algorithm. IEEE Int Conf Robo Auto. April. pp. 2040-2044.
Paull et al. (2013) Sensor-Driven Online Coverage Planning Autonomous Underwater Vehicles. IEEE Trans Mech. 18(6).
Song et al. (2017) An Online Coverage Path Planning Algorithm. IEEE Trans Robot. pp. 1-8.

* cited by examiner

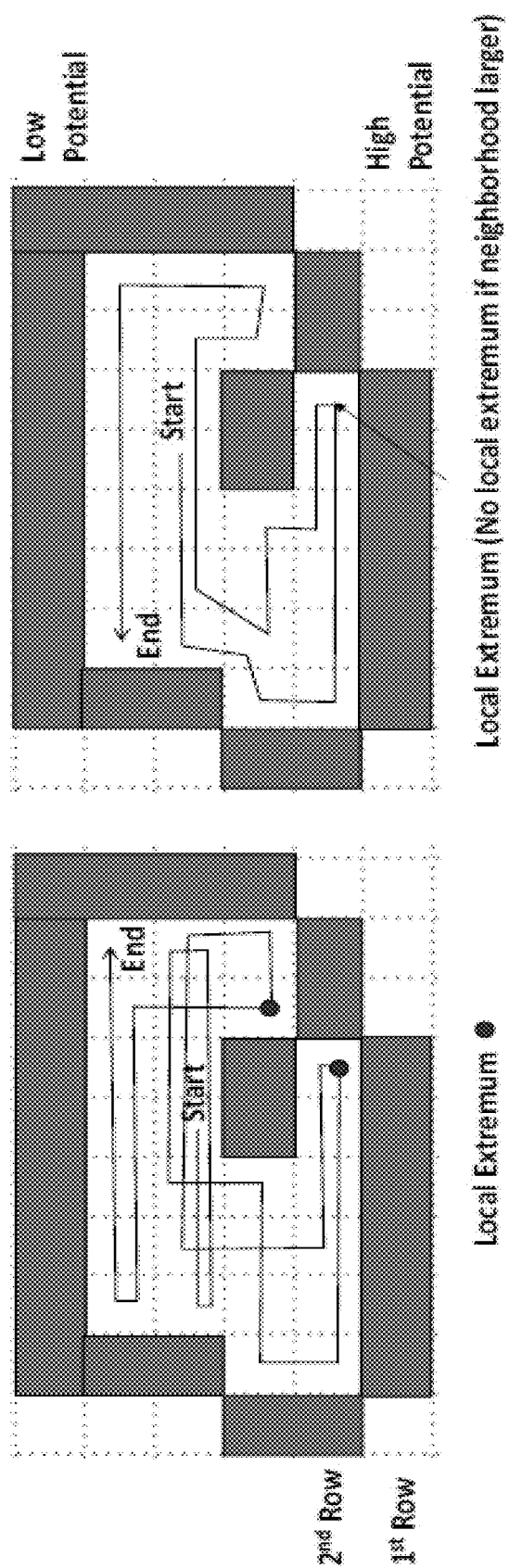

FIG. 10A (Prior)

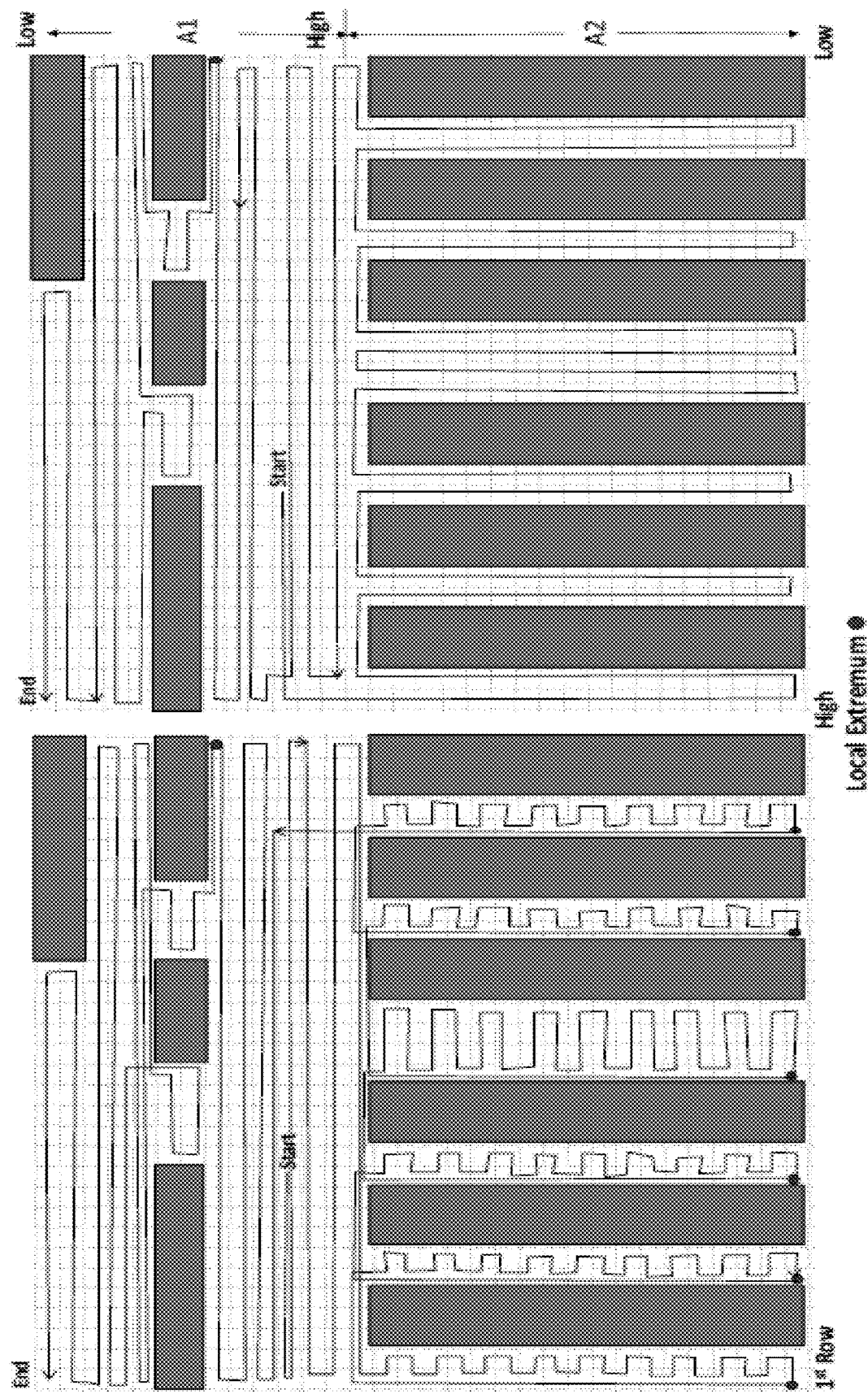
FIG. 11A (Prior)  FIG. 11B

1310 Determine a mapping of an environment that tiles the environment using a plurality of cells, the environment including an autonomous vehicle, the plurality of cells each having an environmental status

1320 While the autonomous vehicle is in the environment:
- Receive status data from the autonomous vehicle, the status data at least related to a location of the autonomous vehicle and to obstacles at the location of the autonomous vehicle,
- Update the environment status for at least one cell based on the status data related to the location of the autonomous vehicle and to obstacles at the location of the autonomous vehicle,
- Determine, for each cell of the plurality of cells, a value for the cell that is based on the environmental status of the cell,
- Determine a waypoint of a coverage path that substantially covers at least a region in the environment, where the coverage path is based on the location of the autonomous vehicle,
- Determine whether the waypoint of the coverage path is reachable from the location of the autonomous vehicle,
- After determining that the waypoint of the coverage path is reachable, send a command directing the autonomous vehicle to begin travel in the environment toward the waypoint of the coverage path, the command based on the mapping of the environment, and
- Update the waypoint of the coverage path based on the status data

FIG. 13

SYSTEM AND METHOD FOR COMPLETE COVERAGE OF UNKNOWN ENVIRONMENTS

CROSS-REFERENCE TO RELATED APPLICATIONS

The present application claims priority to U.S. Provisional Patent Application No. 62/673,090, entitled "System and Method for Complete Coverage of Unknown Environments", filed May 17, 2018, which is entirely incorporated by reference herein for all purposes.

BACKGROUND OF THE INVENTION

Improvements in computing devices and robotic technology have led to increasingly widespread use of robotic devices, including mobile robotic devices and autonomous vehicles. These mobile robotic devices and autonomous vehicles can be used to accomplish a variety of tasks. When mobile robotic devices and autonomous vehicles are deployed, they can follow paths between designated locations in an environment. In some cases, these tasks can involve following paths that reach most, if not all, locations of an environment. For example, robotic devices for automated vacuum cleaning can follow a path that reaches most, if not all locations, of an indoor environment to carry out a cleaning task in the indoor environment.

Other typical operations of autonomous vehicles that require following paths that reach most, if not all, locations of an environment include lawn mowing, map generation, oil spill cleaning, and de-mining. Some of these operations can be conducted in partially or completely unknown environments. Sensor-based methods can be used for online planning for complete coverage.

SUMMARY

In a first aspect, a method is provided. A mapping of an environment that tiles the environment using a plurality of cells is determined. The environment includes an autonomous vehicle. Each of the plurality of cells has an environmental status. While the autonomous vehicle is in the environment: status data is received from the autonomous vehicle, the status data at least related to a location of the autonomous vehicle and to obstacles at the location of the autonomous vehicle; the environmental status is updated for at least one cell based on the status data related to the location of the autonomous vehicle and to obstacles at the location of the autonomous vehicle; for each cell of the plurality of cells, a value for the cell is determined that is based on the environmental status of the cell; a waypoint of a coverage path that substantially covers at least a region in the environment is determined, wherein the coverage path is based on the location of the autonomous vehicle; a determination is made whether the waypoint of the coverage path is reachable from the location of the autonomous vehicle; after determining that the waypoint of the coverage path is reachable, a command is sent directing the autonomous vehicle to begin travel in the environment toward the waypoint of the coverage path, the command based on the mapping of the environment; and the waypoint of the coverage path is updated based on the status data.

In a second aspect, a computing system that includes one or more processing units and a non-transitory computer-readable medium is provided. The non-transitory computer-readable medium stores at least computer-executable instructions that, when executed by the one or more processing units, cause the computing device to perform functions in accordance with the method of the first aspect.

In a third aspect, a non-transitory computer-readable medium is provided. The non-transitory stores at least computer-executable instructions that, when executed by one or more processing units of a computing device, cause the computing device to perform functions in accordance with the method of the first aspect.

In a fourth aspect, a system may include various means for performing functions in accordance with the method of the first aspect.

These, as well as other aspects, embodiments, advantages, and alternatives, will become apparent to those of ordinary skill in the art by reading the following detailed description, with reference where appropriate to the accompanying drawings.

BRIEF DESCRIPTION OF THE DRAWINGS

FIG. 9A shows an example prior art path in an example region.

FIG. 9B shows a path in the example region of FIG. 9A, in accordance with example embodiments.

FIG. 10A shows an example prior art path in another example region.

FIG. 11A shows an example prior art path in another example region.

FIG. 11B shows a path in the example region of FIG. 11A, in accordance with example embodiments.

FIG. 13 is a flow chart of a method, in accordance with example embodiments.

DETAILED DESCRIPTION

Figure 1:
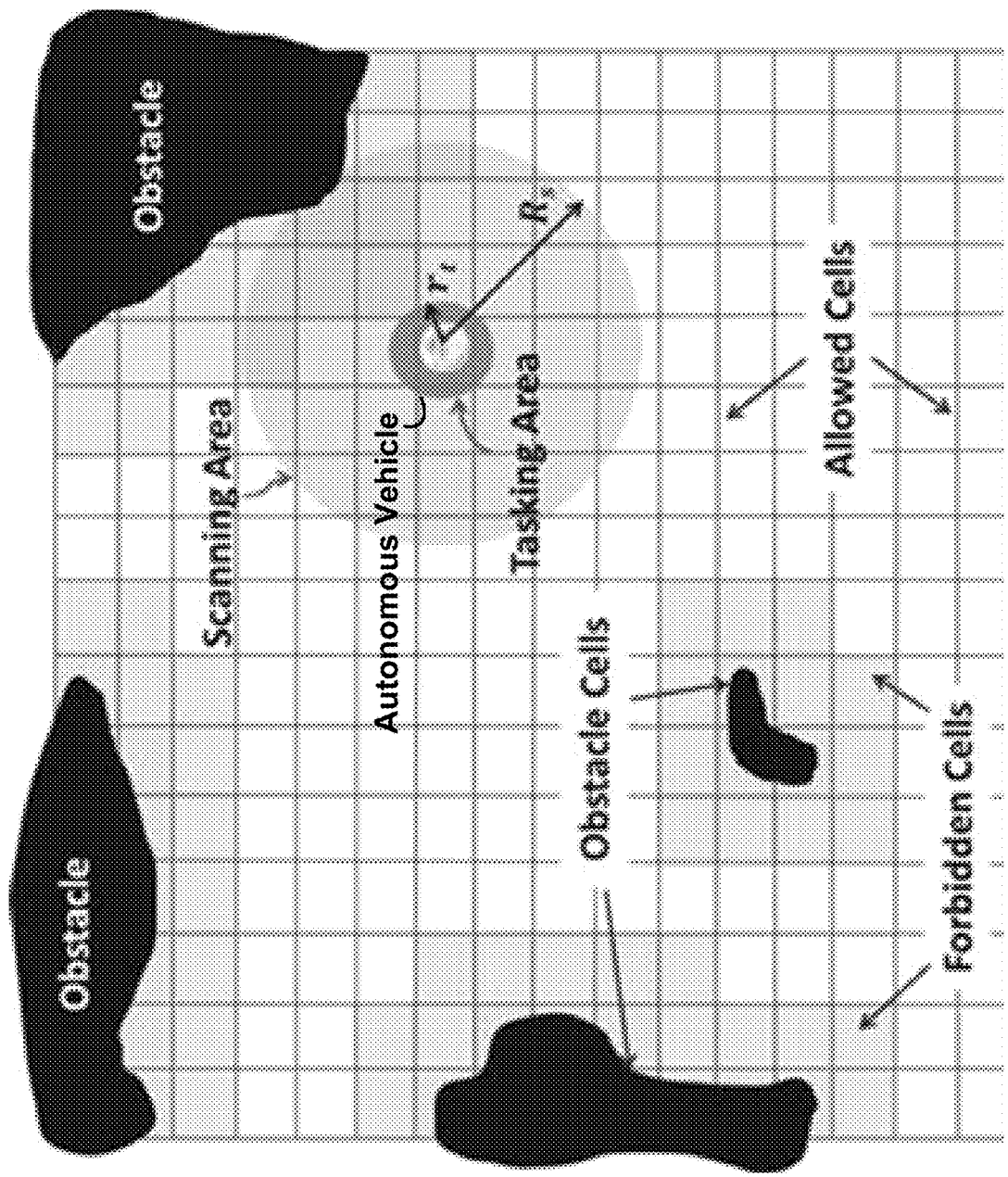
FIG. 1 illustrates an autonomous vehicle working in its environment, in accordance with example embodiments.

Herein are described techniques for online coverage path planning (CPP) that includes providing coverage paths for complete coverage of an a priori unknown environment. Examples of such techniques can be applied to methods and apparatus related to, but not restricted to, autonomous vehicles (e.g., robotics devices, UUVs, UGVs, UAVs).

A variety of algorithms can be used for coverage path planning (CPP) to plan "coverage paths" that reach most, if not all, locations of an environment. CPP algorithms can be categorized as either offline algorithms or online (i.e. sensor-based) algorithms. An offline algorithm can assume knowledge of its environment. An online algorithm can compute a coverage path within its environment; e.g., based on sensor information.

Independently, CPP algorithms can be also categorized as randomized or systematic. Randomized CPP algorithms can follow simple behavior-based rules, requiring neither localization systems nor costly computational resources; however, they can generate strongly overlapped trajectories. In contrast, systematic CPP algorithms can be based on cellular decomposition; that is, a division of a search area of the environment into cells of varying shapes. Some systematic CPP algorithms can decompose a search area into fixed-width cells and presented the sightseer and the seed-spreader strategies for coverage; however, these systematic CPP algorithms are limited to a small set of obstacle geometries.

Some systematic CPP algorithms can use a grid of equal-sized cells to partition a previously-known search area and assign a potential to each cell and generate a coverage path along the steepest ascent from the start to the goal. Some systematic CPP algorithms can use so-called 'ant robots' with limited sensing and computational capabilities to scan unknown areas. Some systematic CPP algorithms can use the Spanning Tree Covering (STC) algorithm for online coverage, which was later improved to Full Spiral STC (FS-STC) algorithm systematic CPP algorithms can use the Backtracking Spiral Algorithm (BSA), which utilizes a spiral filling path for online coverage.

Both STC and BSA generate spiral paths, which limits their application when turning is regarded expensive and undesired. Also use of spiral coverage paths to fill areas can be undesirable as they require a high number of turns that can be expensive for the autonomous system. Some CPP algorithms produce overlapping trajectories, thus leading to longer coverage times. Another set of prior methods rely on critical point detection on obstacles for online cellular decompositions of the search area and then performing back and forth motion in each cell. However, these prior methods require detection of critical points—finding such critical points can be difficult in complex environments. Also, prior critical-point methods require pairing of IN and OUT critical points, which can be difficult. Furthermore, prior methods have the limitation that they cannot work in rectilinear environments.

The herein-described techniques can involve use of a novel algorithm, called ε-STAR, that utilizes the concept of an Exploratory Turing Machine (ETM) to supervise an autonomous vehicle or robotic device to guide the autonomous vehicle or robotic device with adaptive navigation commands to provide coverage of unknown environments. For example, the ETM can provide a supervisory control structure that can take sensor feedback from the autonomous system or robotic device and provide the autonomous system or robotic device with navigational guidance (i.e., waypoints on a coverage path) and operational (i.e., task, move, idle, stop) commands in real-time. This supervisory control structure can be very convenient for implementation on autonomous vehicles. Performance of the ε-STAR algorithm has been validated by high-fidelity simulations and experiments in a laboratory setting on autonomous vehicles.

The ETM can generate a coverage path online using Multiscale Adaptive Potential Surfaces (MAPS), which can include hierarchically-structured and dynamically-updated surfaces that are based on sensor information. The ETM can include a two-dimensional multilevel tape formed by MAPS. The ETM can store and update information corresponding to unexplored, explored, and obstacle-occupied regions, as time-varying potentials on MAPS. In essence, the ETM takes advantage of both the potential field-based and sensor-based planning methods by incrementally building the MAPS using real-time sensor measurements. While, by default the ETM uses the lowest level of MAPS for generating the coverage path online, the ETM can switch to higher levels as needed to escape from a local extremum.

A local extremum of a path can be a location of the path where an autonomous vehicle (or other entity) following the path will not be able to move further along the path. As such, a path in an environment having a local extremum can cause an autonomous vehicle (or other entity) to shut down, stop, and/or require human intervention to continue operation in the environment; thereby making the autonomous vehicle (or other entity) less efficient. Thus, it is advantageous if local extrema are avoided when generating paths for autonomous device operation.

To address the local extremum problem, the ETM can first use MAPS to generate coverage paths at a first level of a multiple levels in MAPS. If a local extremum arises at the first level of MAPS, then the ETM can move to a second level of MAPS to avoid the local extremum found on the first level. If the local extremum cannot be avoided on the second level, then the herein-described techniques can proceed to higher level(s) of MAPS to attempt to avoid the local extremum at each level. By attempting avoidance of the local extremum at multiple levels, the herein-described techniques can solve the local extremum problem, leading to complete coverage by a coverage path.

The herein-described techniques can generate a desired back-and-forth coverage path with significantly less number of turns and shorter trajectory lengths than prior methods. Also, the herein-described techniques can control a sweep direction to reduce the number of turns. For example, when applied to floor cleaning, if the (rectangular) shapes of some rooms are known, then the herein-described techniques can be adjusted to generate a back-and-forth coverage path to clean a rectangular room along a long edge, further reducing the number of turns.

Such back-and-forth coverage paths advantageously lead to significant savings in coverage time and hence energy (e.g., battery power, fuel, electricity) and other resource costs. Also, back-and-forth coverage paths can be natural coverage techniques in many applications (e.g., house cleaning applications, object/resource searching applications). Further, the herein-described techniques do not rely on critical point detection on obstacles (as required by other set of existing approaches which produce back and forth path).

As such, the herein-described techniques can provide at least the following beneficial features:
(i) generation of desirable back-and-forth complete coverage paths including an adjustable sweep direction in known areas (if any) to reduce the number of turns without reliance on critical point detection;
(ii) computational efficiency, hence suitable for real-time implementation; and
(iii) elimination of the local extremum problem, thus enabling complete coverage of unknown environments in finite time.

The herein-described techniques can compute waypoints of paths using local information in a neighborhood, which can beneficially have a fairly low computational complexity and can be suitable for real-time implementations. In some examples, the herein-described techniques can provide multi-robot coverage and/or can include Simultaneous Localization and Mapping (SLAM) with coverage control.

The herein-described techniques have been validated by both simulations and physical experiments. Results show superior performance of coverage paths generated using the herein-described techniques in terms of significantly fewer turns and a shorter coverage trajectory length compared to existing coverage approaches. The herein-described techniques can be utilized for various applications that require complete coverage; e.g., applications such as, but not limited to, agricultural applications including crop seeding, fertilizing, cutting, and/or harvesting, floor cleaning, lawn mowing, map generation, snow removal, oil spill cleaning, de-mining, search and rescue, painting, and/or pool cleaning.

Table I lists terms and acronyms used herein.

TABLE I

| Term/Acronym | Description |
|---|---|
| $\alpha^0, a^1, \ldots \alpha^L$ | Indices of cells of tilings of levels 0, 1, ... L of a MAPS |
| $\varepsilon$ | Side length of a square tiling (e.g., tiling T) |
| $\varepsilon$-cell | One tile in an $\varepsilon$-cell tiling |
| $\varepsilon$-cell tiling | A tiling of a region or area (e.g., estimated region A) that is formed using square tiles of side length $\varepsilon$. |
| $\varepsilon$-coverage | A sequence of $\varepsilon$-cells that covers a predetermined area |
| $\varepsilon$-STAR | $\varepsilon$-coverage via Structural Transitions to Abstract Resolutions |
| A | Estimated region that includes a desired area |
| ASIC | Application-Specific Integrated Circuit |
| Autonomous vehicle (AV) | A device (e.g., a mobile robot, a UAV, a UGV, a UGV) that can travel between locations and/or carry out a complex series of actions in an environment without human intervention (i.e., the device can be controlled by a possibly-on-board computing device) |
| AWGN | Additive White Gaussian Noise |
| B | Time-invariant exogenous potential field for tiling T, where $B_{index} \in \{B_{min}, \ldots, B_{max}\}$, where index selects a cell in tiling T. |
| $\overline{B}_{index}$ | Mean exogenous potential of cells in tiling T indexed by index. |
| BSA | Backtracking Spiral Algorithm |
| $C_{a,\lambda}$ | Cost to reach centroid of cell a from cell $\lambda$ |
| $C_{Tr}$ | Cost of traveling per unit distance |
| $C_{Tu}$ | Cost of turning per unit degree |
| cd | Operational command for the autonomous vehicle |
| CD-ROM | Compact-Disc Read Only Memory |
| Cell (or tile) | A representation of a region of an environment. In some cases, a cell (or tile) has one or more corresponding values regarding aspects of a corresponding region of the environment; e.g., a value associated with a visited region, a value associated with a region with an obstacle. |
| cm | Complete task status of ts |
| Coverage Path | A path of a region of an environment that reaches each portion of the region of an environment, perhaps without self-intersecting; that is, the path "fills" or "covers" the region of the environment. In some cases, a portion of the region of the environment can be represented by a tile or cell. |
| CRT | Cathode Ray Tube |
| $CP^0, CP^1, \ldots, CP^L$ | Compute machine states in Q for levels 0, 1, ... L of a MAPS |
| CPP | Coverage Path Planning |
| CPU | Central Processing Unit |
| $D^l$ | Computing set for level l of a MAPS; $0 \leq l \leq L$ |
| $d_{a,\lambda}$ | Distance between centroid of cell a and cell $\lambda$ |
| $\delta$ | A control function in tuple M |
| Directly reachable cell | Cell that is not behind an obstacle |
| DLP | Digital Light Processing |
| $DR(\lambda)$ | Set of all directly reachable cells in $N^0(\lambda)$ |
| DSA | Digital Signature Algorithm |
| $E^l(k)$ | Potential surface at level l of a MAPS at time k |
| Eligible cell | A cell that is directly reachable and is unexplored |
| Environment | An indoor area and/or an outdoor area that may include one or more obstacles. Example environments include, but are not limited to, part or all of: a building, a parking lot, a building with a parking lot, a campus of buildings and outdoor areas, an oilfield, a sea floor, and/or a park. |
| ETM | Exploratory Turing Machine |
| F | A final state in tuple M |
| FN | Finish machine state in Q |
| Forbidden zone | A region around an obstacle |
| FSA | Finite State Automaton |
| FS-STC | Full Spiral Spanning Tree Coverage |
| GPS | Global Positioning System |
| GPU | Graphics Processing Unit |
| $I(\cdot)$ | Random cell selection function |
| ic | Incomplete task status of ts |
| id | Idle operational command of cd |
| $I_p$ | Set of input parameters containing feedback information received from the autonomous vehicle in tuple M |
| $i_{p1}, i_{p2}$ | Specific input vectors |
| $\lambda$ | Index of an cell where the autonomous vehicle is currently located on tiling T; $\lambda$ can be an input parameter of $I_p$ |
| $\lambda^{down}$ | The cell below a cell indexed by $\lambda$ |
| $\lambda^{up}$ | The cell above a cell indexed by $\lambda$ |

TABLE I-continued

| Term/Acronym | Description |
| --- | --- |
| l | Level value in MAPS; e.g., index value |
| L | Maximum level value in MAPS |
| LCD | Liquid Crystal Display |
| LED | Light Emitting Diode |
| m | Meter |
| M | Tuple defining a Turing machine; e.g., ETM. For example, $M = (Q, \Xi, I_p, O_p, \delta, q_0, F)$. |
| MAPS | Multiscale Adaptive Potential Services |
| MCC | Number of coarse cells in a neighborhood of level l of a MAPS, where $l \geq 1$. |
| mm | Millimeter |
| MST | Multiscale Tiling |
| $\mu$ | A particular waypoint in wp. The centroid of $\mu$ is $(\mu_{x_c}, \mu_{y_c})$ |
| mv | Move operational command of cd |
| N | Number of $\varepsilon$-cells in a neighborhood of level 0 of a MAPS |
| $N^l$ | Local neighborhood at level l of a MAPS |
| O(x) | Computational complexity of x; |
| ol | Input parameter with vector of obstacle locations |
| OLED | Organic Light Emitting Diode |
| OP | Set of output parameters containing instructions for the autonomous vehicle in tuple M |
| $o_{p1}, o_{p2}, o_{p3}, o_{p4}$ | Specific output vectors |
| $p_{index}(k)$ | Probability of unexplored $\varepsilon$-cells in a cell indexed by index at time k |
| $\Pi$ | Set of all possible configurations of potentials on a particular level of a MAPS |
| Q | Set of machine states in tuple M |
| $q_0$ | An initial state in tuple M |
| QR | Quick Response Code |
| $r_c$ | Coverage ratio |
| $r_t$ | Task-related radius |
| $R_s$ | Radius of a circular region |
| R(T) | Total area of a tiling T |
| RAM | Random Access Memory |
| ROM | Read-Only Memory |
| RTK | Real-Time Kinematic |
| S | Symbolic state set for cells. S can be $S = \{O, F, E, U\}$, where O is a state representing a cell having an obstacle, F is a state representing a cell in a forbidden zone, E is a state representing an explored cell, and U is a state representing an unexplored cell |
| $s_{index}(k)$ | Symbolic state for cell of tiling T indexed by "index" at time k |
| $\sigma$ | Standard deviation |
| SLAM | Simultaneous Localization and Mapping |
| sp | Stop operational command of cd |
| ST | Start machine state in Q |
| STC | Spanning Tree Coverage |
| Substantially Covering Path | A path of a region of an environment that reaches at least a threshold amount or percentage of the region of the environment, where a region of the environment can include part or the entire environment. Example threshold amounts and percentages include, but are not limited to: 50% of the region, 60% of cells of the environment, 75% of the region, 80% of tiles, cells, and/or portions of the environment, 83.33% of the environment, 100% of the region, 78 tiles, 1000 square feet of the region, 15,000 square feet in the environment, 1000 square feet and/or 75% of the region, one room in the region, and three rooms in the environment. |
| $\tau$ | A tile in tiling T |
| $\tau_{index}$ | A tile in tiling T as indexed by index; e.g., $\tau_\alpha^o$ is the tile in tiling $T^0$ at index $\alpha^0$ |
| T | Tiling of estimated region A |
| $T^0, T^1, \ldots, T^L$ | Tilings of levels $0, 1, \ldots L$ of a MAPS |
| $T^a$ | A set of allowed cells in an $\varepsilon$-cell tiling |
| $T^f$ | A set of forbidden cells in an $\varepsilon$-cell tiling |
| $T^o$ | A set of obstacle cells in an $\varepsilon$-cell tiling |
| $\theta_h$ | Heading angle of autonomous vehicle |
| $\theta_{a, \lambda}$ | Turning angle to reach centroid of cell from cell $\lambda$ |
| tk | Task operational command in cd |
| ts | Input parameter for task status of the autonomous vehicle in the $\varepsilon$-cell where the autonomous vehicle is currently located |
| UAV | Unmanned Aerial Vehicle |
| UGV | Unmanned Ground Vehicle |
| Unexplored cell | A cell with positive potential |
| USB | Universal Serial Bus |
| UUV | Unmanned Underwater Vehicle |
| Waypoint | A location or "point" on a path, such as a coverage path. For example, an autonomous vehicle can be directed to follow a path by following a command to travel from the autonomous vehicle's current location on the path to one or more waypoints that are also on the path. |
| wp | waypoint candidate set |

TABLE I-continued

| Term/Acronym | Description |
| --- | --- |
| wp(k) | waypoint at time k |
| WT | Wait machine state in Q |
| Ξ | Set of potential values of a cell in tuple M |
| $\Xi_{min}^l, \ldots, \Xi_{max}^l$ | Range of potential values that can be encoded on each cell at level l of a MAPS |

FIG. 1 illustrates an autonomous vehicle working in its environment, in accordance with example embodiments. The autonomous vehicle as shown in FIG. 1 can include: i) a localization device (e.g. a GPS device), ii) range detectors (e.g. one or more laser scanners) to detect obstacles within a circular region of radius $R_s \in R^+$, and iii) one or more task-specific sensors for performing one or more tasks (e.g., cleaning) with a circular area of radius $r_t \leq R_s$. For operation in GPS-denied environments, the ε-STAR algorithm can be integrated with a SLAM algorithm to achieve coverage.

Let $A \subset R^2$ be the estimated region which includes a desired area of an environment to be covered. In some examples, the desired area of the environment is the entirety of the environment; then, A would be an estimated region that includes the entirety of the environment.

To define a tiling on A, let a set $T=\{\tau_\alpha \subset R^2, \alpha=1, \ldots, |T|\}$ be called a tiling of A if the elements of T: i) have mutually exclusive interiors, i.e. $\tau_\alpha^\circ \cap \tau_\beta^\circ = \emptyset$, $\forall \alpha, \beta \in \alpha=\{1, \ldots, |T|\}$ $\alpha \neq \beta$, where $^\circ$ denotes an interior, and ii) form an exact cover of A; i.e., $A \subseteq \cup_{\alpha=1}^{|T|} \tau_\alpha$. If an exact cover is not possible (e.g., square tiles cannot exactly cover a circular region), condition ii) can be relaxed to $A \subseteq \cup_{\alpha=1}^{|T|} \tau_\alpha$ to form a minimal tiling of A such that removal of any single tile destroys the covering property.

The tiling formed by square tiles of side length ε is called an ε-cell tiling and each cell of the ε-cell tiling is called an ε-cell. It is recommended that an ε-cell should be at least big enough to contain the autonomous vehicle and small enough for the task-specific sensor(s) of the autonomous vehicle to be able to cover it when the autonomous vehicle passes through it. Within these two bounds, the choice of ε depends on the following factors. A smaller ε provides a better approximation of the search area and its obstacles. On the other hand, a larger ε reduces the computational complexity by requiring less number of ε-cells to cover the area and it also provides improved robustness to uncertainties for localization within a cell.

The tiling T is partitioned into three sets of ε-cells: i) obstacle ($T^o$), ii) forbidden ($T_f$), and iii) allowed ($T^a$), as shown in FIG. 1. Obstacle ε-cells can include ε-cells that are occupied by obstacles, forbidden ε-cells can create a buffer around the obstacles to prevent collisions due to inertia or large turning radius of the autonomous vehicle. The remaining ε-cells can be placed into the allowed set of ε-cells and so the allowed set of ε-cell can include the ε-cells desired to be covered by a covering path. The autonomous vehicle can discover obstacles online, update the sets of obstacle and forbidden cells, and perform tasks in the allowed cells.

The concept of ε-coverage of the allowed ε-cells can be defined. Let $R(T^a)$ denote the total area of the allowed ε-cells in $T^a \subseteq T$. Let $\tau(k) \in T^a$ be the ε-cell in T visited by the autonomous vehicle at time k and explored by the task-specific sensor(s) of the autonomous vehicle. Then, A is said to achieve ε-coverage if $\exists K \in Z^+$ such that the sequence $\{\tau(k), k=1, \ldots, K\}$ covers $R(T_a)$; i.e., $$R(T^a) \subseteq \cup_{k=1}^{K} \tau(k) \quad (1)$$

ε-coverage achieves complete coverage if the task-specific sensor(s) completely cover every visited ε-cell. The ε-STAR algorithm utilizes the concept of an ETM for ε-coverage of unknown environments.

Figure 2:
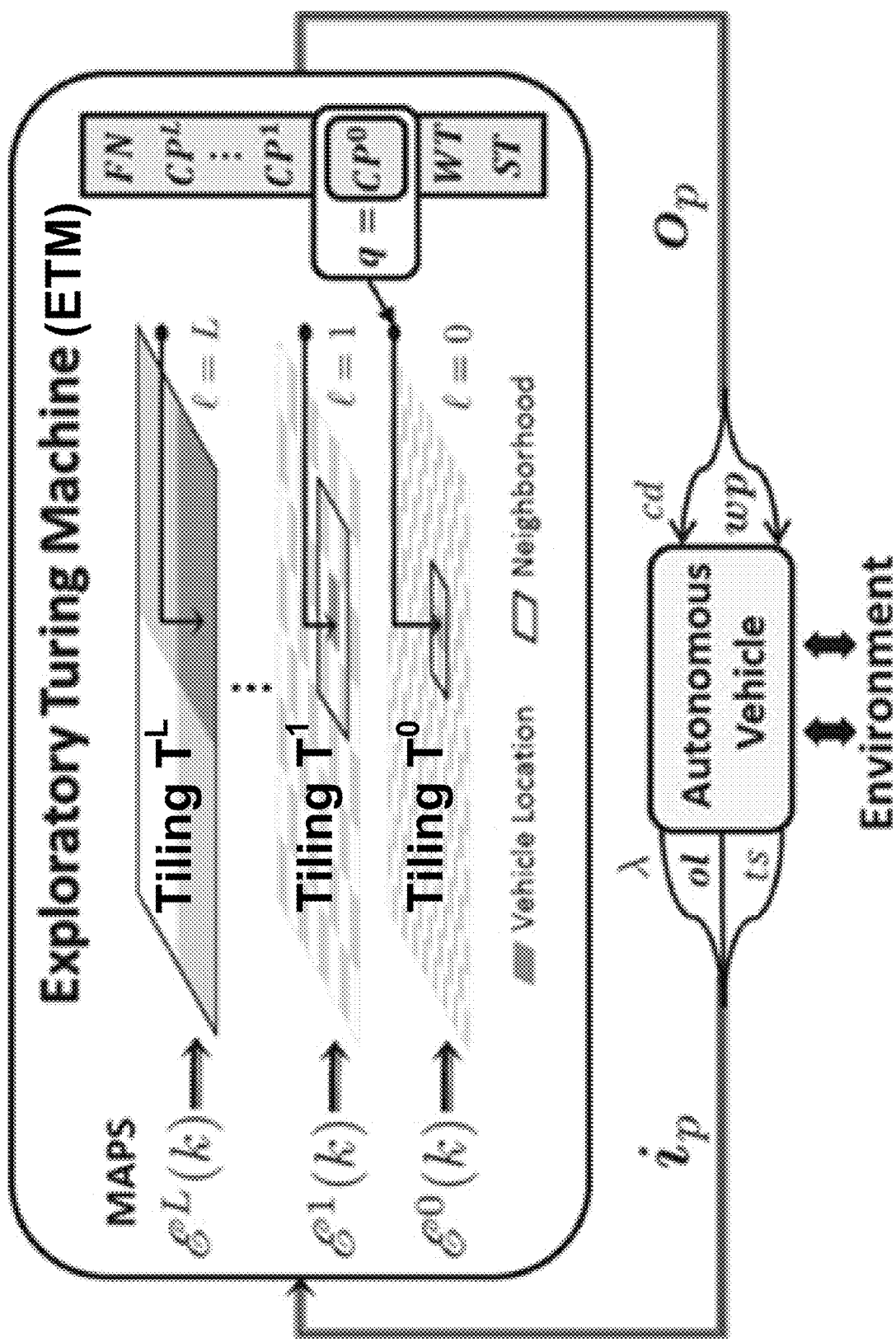
FIG. 2 illustrates an ETM as a supervisor of the autonomous vehicle, in accordance with example embodiments.

FIG. 2 illustrates an ETM as a supervisor of the autonomous vehicle, in accordance with example embodiments. As indicated by FIG. 2, the ETM constantly takes feedback from the autonomous vehicle. In turn, the ETM acts as a supervisor to guide the autonomous vehicle with operational commands and navigation waypoints; thus, it falls in the category of Interactive Transition Systems. In some examples, the ETM can include a single tape head and a two-dimensional multilevel tape formed by MAPS, which act as guidance surfaces for decision making.

Formally, the ETM is defined as a 7-tuple $M=(Q, \Xi, I_p, O_p, \delta, q_0, F)$ where:

$Q=\{ST, CP^0, \ldots, CP^L, WT, FN\}$ is a set of machine states, where the machine states include ST≡"Start", CP≡"Compute", WT≡"Wait", and FN≡"Finish". The superscript on the CP machine state can specify the level of MAPS at which the head is operating. The WT state implies waiting for the autonomous vehicle to finish tasking in the current ε-cell.

$\Xi=\{\Xi^l: l=0, 1, \ldots, L\}$, where $\Xi^l=\{\Xi_{min}^l, \ldots, \Xi_{max}^l\}$ is the set of potential values that can be encoded on each cell at level l of the MAPS.

$I_p$ is a set of input parameters containing the feedback information received from the autonomous vehicle. An input vector $i_p \in I_p$ includes:

λ∈{1, ..., |T|}: Index of the ε-cell where the autonomous vehicle is currently located on tiling T. λ can be computed using the localization device and/or other positioning systems of the autonomous vehicle.

ol ⊂ {1, ..., |T|}: Vector of the obstacle locations, which includes the indices of all ε-cells where obstacles are detected; e.g. using one or more range detectors of the autonomous vehicle.

ts∈{cm, ic}: Task status of the autonomous vehicle in the ε-cell where the autonomous vehicle is currently located, where cm≡"Complete" and ic≡"Incomplete".

$O_p$ is a set of output parameters containing instructions for the autonomous vehicle. An output vector $o_p \in O_p$ includes:

cd∈{mv, tk, id, sp}: Operational command, where mv≡"Move", tk≡"Task", id≡"Idle", and sp≡"Stop".

wp ⊂ {1, ..., |T|}: Candidate set of navigation waypoints for a trajectory of the autonomous vehicle on tiling T.

δ is a control function that is a partial mapping from $I_p \times Q \times \Pi_{N^l} \to Q \times \Pi \times O_p$, where Π is the set of all possible configurations of potentials on MAPS generated by the sets $\Xi^l$ while $\Pi_{N^l}$ is the above set restricted to a local neighborhood $N^l$ at Level l of the MAPS.

$q_0$=ST is the initial state, and

F=FN is the final state implying complete coverage.

An advantage of using a Turing Machine, such as an ETM, over a Finite State Automaton (FSA) is that the Turing Machine has the capacity of containing memory which is a necessary feature for coverage problems.

To build MAPS, first a hierarchical multiscale tiling (MST) is constructed on the area A; e.g., using recursive decomposition. As shown in FIG. 2, the ε-cell tiling T at level l=0 of the MAPS of the search area forms the finest level of the MST and is referred as $T^0$ from now on. Let n∈N be the maximum number of ε-cells along an x-axis over all rows. If n is even, then the axis is divided into two regions of n/2 elements each. If n is odd, then the axis is divided into two regions with n' and n'−1 elements, such that n'∈N and 2n'−1=n. This procedure is repeated along the y-axis over all columns to generate 4 coarse cells in total, which form the coarsest tiling, i.e. $T^L$, L∈N. Now, again let n∈N be the maximum number of ε-cells along the x-axis in a coarse cell. Then, using the above procedure, each of these four coarse cells is further divided into two regions along each axis to generate 16 cells in tiling $T^{L-1}$. This procedure is repeated until n/2<2 or n'−1<2 to generate a MST with tilings $T^0$, $T^1$, ..., $T^L$ such that $T^l = \{\tau_{\alpha^l}: \alpha^l=1, \ldots, |T^l|\}$, ∀l∈ {0, ..., L}, where $\alpha^l$ indexes coarse cells at Level l of the MST, while $\alpha^0$ indexes ε-cells.

To model a potential surface at level l=0, the potential surface is constructed as follows. First, the environmental information is encoded on $T^0$ by assigning a symbolic state to each ε-cell $\tau_{\alpha^0} \in T^0$ from symbolic state set S={O, F, E, U}, where O≡obstacle, F≡forbidden, E≡explored, and U≡unexplored. Then, the potential surface $E^0(k) = \{E_{\alpha^0}(k) \in \Xi^0: \alpha^0 = 1, \ldots, |T^0|\}$ is constructed by assigning a discrete potential to each $\tau_{\alpha^0}$, such that $$E^0(k) = \begin{cases} -1, & \text{if } s_{\alpha^0}(k) = O \text{ or } F \\ 0, & \text{if } s_{\alpha^0}(k) = E \\ B_{\alpha^0}, & \text{if } s_{\alpha^0}(k) = U \end{cases} \quad (2)$$

where $s_{\alpha^0}(k) \in S$ is the state of $\tau_{\alpha^0}$ at time k. The first condition in Equation (2) assigns a potential of −1 to ε-cell $\tau_{\alpha^0}$ if $\tau_{\alpha^0}$ contains an obstacle or if $\tau_{\alpha^0}$ is forbidden, i.e. $\tau_{\alpha^0}$ lies in an obstacle neighborhood. Assigning a potential of −1 to ε-cell $\tau_{\alpha^0}$ if $\tau_{\alpha^0}$ creates a "forbidden zone" around obstacles to prevent the autonomous vehicle from colliding with the obstacles due to inertia, skidding, large turning radius, or localization errors. The second condition in Equation (2) assigns a potential of 0 to ε-cell $\tau_{\alpha^0}$ if $\tau_{\alpha^0}$ has been explored by the task-specific sensor(s) of the autonomous vehicle. The third condition assigns a potential of $B_{\alpha^0}$ to ε-cell $\tau_{\alpha^0}$ if $\tau_{\alpha^0}$ is yet unexplored, where $B = \{B_{\alpha^0} \in \{1, \ldots, B_{max}\}, \alpha^0 = 1, \ldots, T^0\}$ is a time-invariant exogenous potential field.

Figure 3:
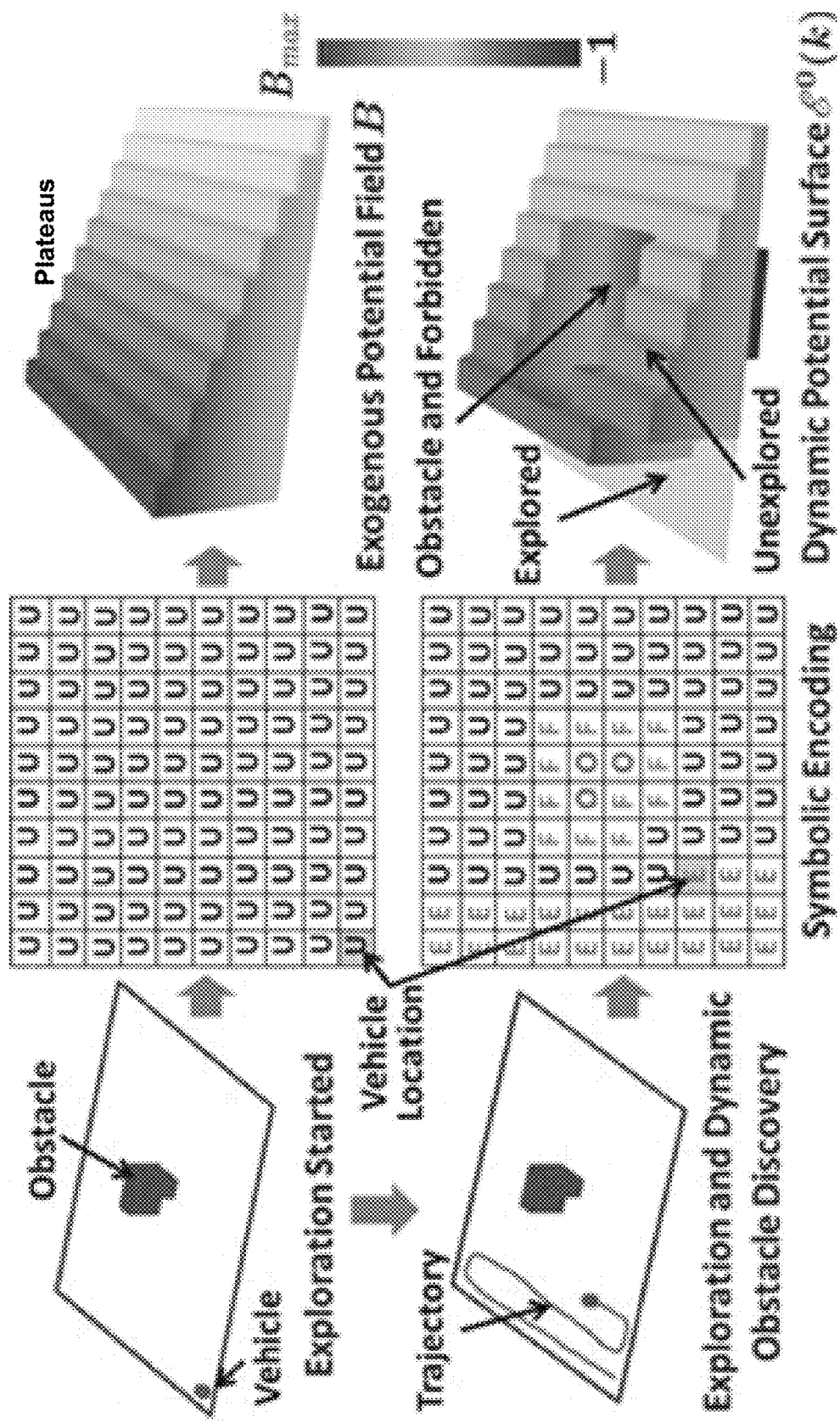
FIG. 3 illustrates a dynamic construction of a potential surface, in accordance with example embodiments.

FIG. 3 illustrates dynamic construction potential surface $E^0$ in accordance with example embodiments. In some examples, construction of potential surface $E^0$ can be designed offline. Potential surface $E^0$ can have plateaus of equipotential surfaces along each column of the tiling. As shown at upper left of FIG. 3, these plateaus can monotonically increase in height by one unit from 1 on the rightmost column to $B_{max}$ on the leftmost column. This field facilitates back and forth motion in an obstacle-free region by following the highest equipotential surface from left to right. A sweep direction for the autonomous vehicle can be adapted by modifying B. In this example, $\Xi_{min}^0 = -1$ and $\Xi_{max}^0 = B_{max}$. The symbolic encoding can be updated by the ETM using sensor information from the autonomous vehicle to result in a dynamically changing potential surface $E^0(k)$ as shown in the lower portion of FIG. 3.

To model a potential surface at level l, where 1≤l≤L, a potential surface $E^l(k) = \{E_{\alpha^l}(k) \in \Xi^l: \alpha^l=1, \ldots, |T^l|\}$ is constructed by assigning a potential to each coarse cell $\tau_{\alpha^l} \in T^l$. This is done by assigning $\tau_{\alpha^l}$ the average potential generated by all unexplored ε-cells within $\tau_{\alpha^l}$ such that $$E_{\alpha^l}(k) = p_{\alpha^l}^U(k) \overline{B}_{\alpha^l} \quad (3)$$

where $p_{\alpha^l}^U(k)$ is the probability of unexplored ε-cells in $\tau_{\alpha^l}$ and $\overline{B}_{\alpha^l}$ is the mean exogenous potential of $\tau_{\alpha^l}$. In some examples, probability $p_{\alpha^l}^U(k)$ can be computed using a counting process. It can be seen that $\Xi_{min}^l = 0$ and $\Xi_{max}^l = \max_{\tau_{\alpha^l} \in T^l} \overline{B}_{\alpha^l}$.

Figure 4:
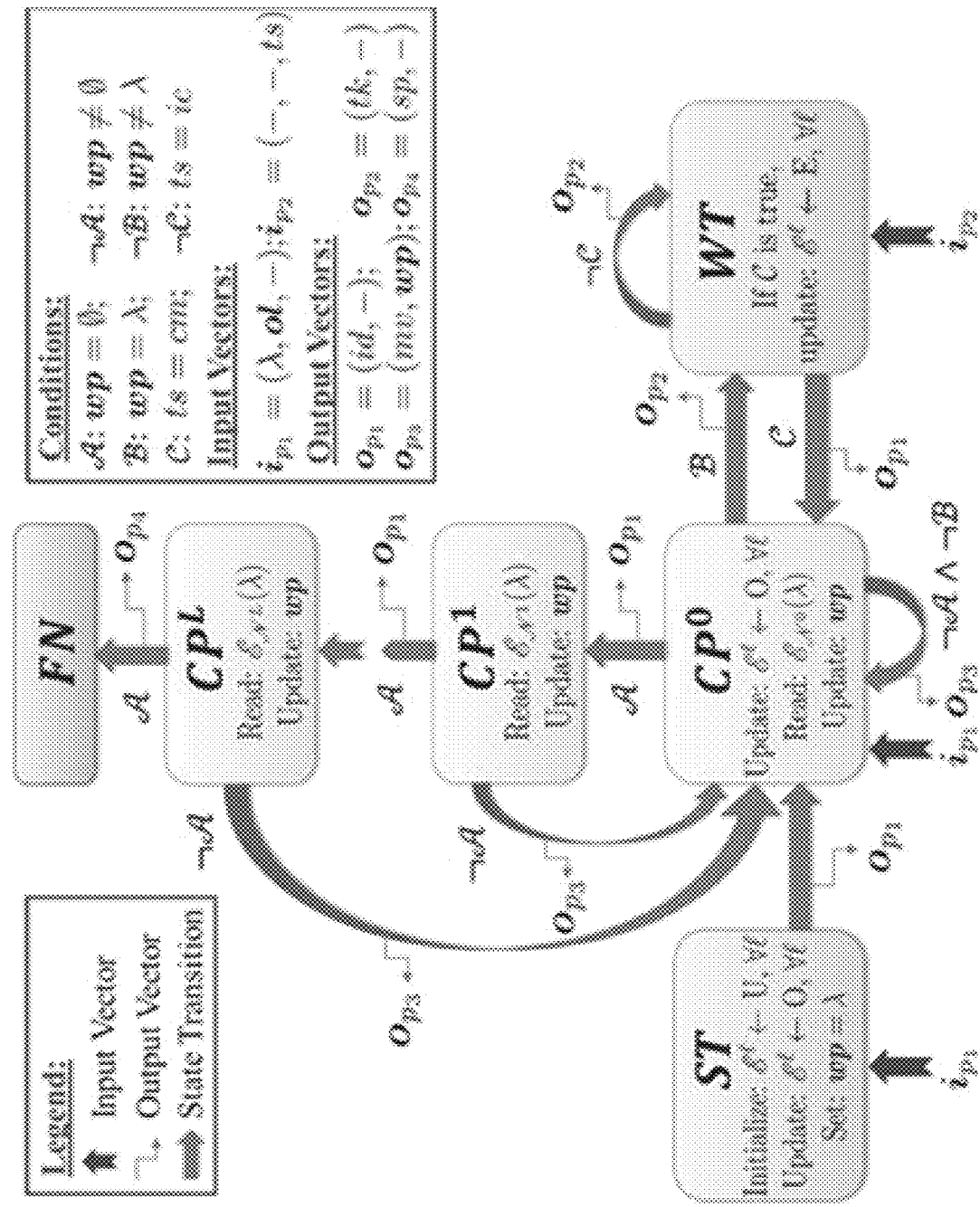
FIG. 4 shows a state transition graph of an exploratory Turing machine, in accordance with example embodiments.

FIG. 4 shows a state transition graph of an ETM, in accordance with example embodiments. The ETM of the ε-STAR algorithm can act a supervisor for an autonomous vehicle by functioning as follows. The single tape head of the ETM can have a state q∈Q and can operate on one level of the MAPS at a time; by default, the ETM operates on level 0 of the MAPS. The state transition graph shown in FIG. 4 can realize the control function δ of the ETM. The input vectors $i_{p_j} \in Ip$, j=1, 2, the output vectors $o_{p_j} \in Op$, j=1, ..., 4 and the state transition conditions are defined in FIG. 4. In particular, FIG. 4 shows that input vector $i_{p_1}$ is defined as $i_{p_1} = (\lambda, ol, -)$; input vector $i_{p_2}$ is defined as $i_{p_2} = (-, -, ts)$; output vector $o_{p_1}$ is defined as $o_{p_1} = (id, -)$; output vector $o_{p_2}$ is defined as $o_{p_2} = (tk, -)$; output vector $o_{p_3}$ is defined as $o_{p_3} = (mv, wp)$; and output vector $o_{p_4}$ is defined as $o_{p_4} = (sp, -)$, where "−" represents an unused value in a vector.

A summary of operational details the ETM in each state of Q follows. In state ST, the ETM can initialize the MAPS. Since an area represented by the MAPS is initially unexplored, all ε-cells can be are assigned to state U of symbolic state set S, thus MAPS can be constructed using only the potential field B. Then, the ETM can cycle on and between states $CP^0$ and WT as follows. While in state $CP^0$, the ETM takes input from the autonomous vehicle about the newly discovered obstacle locations and its current position (λ). Then, the ETM moves the single tape head on the tape to λ and updates the MAPS in accordance with the discovered obstacles. The ETM then performs the following operations:
  i) reads the potentials from the local neighborhood $N^0(\lambda)$ of λ to compute a new waypoint,
  ii) changes the state q to WT if a waypoint is reached otherwise, the state q stays in $CP^0$, and
  iii) generates an output vector for the autonomous vehicle containing the operational command and the new waypoint.

While in state WT, the ETM can receive that task status from the autonomous vehicle, and continue to send an operational command to the autonomous vehicle until the operational command is completed. Once the current cell is tasked, the ETM can update the MAPS and return to the state $CP^0$.

If the single tape head of the ETM gets stuck in a local extremum in state $CP^0$, i.e. the ETM does not find a waypoint in a local neighborhood at Level 0 of the MAPS, the ETM can switch to state $CP^1$ and operates on Level 1 of the MAPS. While in state $CP^1$, the ETM can search for a coarse cell with the highest positive potential in a local neighborhood $N^1(\lambda)$ to find a waypoint. If no such coarse cell exists, and so no waypoint is found at Level 1, then the ETM switches to state $CP^2$ and so on until it finds such a coarse cell, then the ETM switches to state $CP^0$ and continues. If no waypoint is found even at the highest level (Level L) then the ETM halts in state FN and the coverage is complete. The details of operations in each state are explained below.

ETM Operation in the ST State: The ETM starts in state q=ST at k=0 when the autonomous vehicle is first turned on. Since no a priori information is available, all ε-cells in $T^0$ are initialized with the state U of symbolic state set S, i.e. unexplored. Then all ε-cells are assigned potentials according to field B using Equation (2). Subsequently, all higher level cells are assigned potentials using Equation (3) by substituting $p_{\alpha^l}^U(0)=1$. This MAPS initialization process can be denoted as $E^l \leftarrow U, \forall l \in \{0, \ldots, L\}$.

Map Updating Process:

Next, the autonomous vehicle can detect its current location λ and vector of obstacle locations ol using its onboard sensors, and sends this information to the ETM via an input vector $i_{p_1} \in I_p$. The ETM can move its tape head to λ and initialize waypoint wp=λ. Then, the ETM can update symbolic encoding of ε-cells by changing states of indices of all ε-cells in vector of obstacle locations ol (that is, ε-cells with newly discovered obstacles) to state O of symbolic state set S, and their associated neighborhood cells to state F of symbolic state set S; subsequently, potentials of these ε-cells are updated to −1 using Equation (2). Then, the ETM can update the probabilities $p_{\alpha^l}^U(0)$ at all higher levels, since the corresponding coarse cells contain the newly discovered obstacles. The probabilities $p_{\alpha^l}^U(0)$ can be updated by counting the remaining unexplored ε-cells inside those coarse cells. The potential surfaces $\forall l \in \{0, \ldots, L\}$ can be updated using Equation (3). This MAPS updating process can be denoted as $E^l \leftarrow O \forall l \in \{0, \ldots, L\}$.

Then, the state q of the ETM can transition to state $CP^0$ and can send an output vector $o_{p_1} \in O_p$ to command the autonomous vehicle to go 'idle'; e.g., by sending operational command cd=id as part of $o_{p_1}$.

ETM Operation in the $CP^0$ State:

$CP^0$ is the default state to compute waypoints. Every time the ETM reaches $CP^0$, the ETM can receive an input vector $i_{p_1} \in I_p$ from the autonomous vehicle containing its current position λ and any newly discovered obstacle locations ol. Then, the ETM can move the single tape head to λ and updates the MAPS at all levels, i.e. $E^l \leftarrow O \forall l \in \{0, \ldots, L\}$, as described previously. Next, the ETM can reads the potentials $E_{N^0(\lambda)}$ in local neighborhood $N^0(\lambda)$ including λ. Based on these potentials, the ETM can compute a next waypoint wp(k) by following Algorithm 1, which is listed below.

Algorithm 1

```
input: wp(k−1), λ, E_N^l, q ∈ {CP', l = 0, ..., L}
output : wp(k)
01 if q = CP^0 then
02    compute D^0                    // form the computing set D^0 using Equation (4)
03    if λ ∈ D^0 then                 // current cell λ is unexplored
04       if { λ^up, λ^down } ⊂ D^0 then   // λ^up and λ^down unexplored
05          wp(k) = { λ^up, λ^down }  // autonomous vehicle picks one per Equation (5)
06       else wp(k) = λ;              // set λ, as waypoint and start tasking
07    else if D^0 ≠ ∅ then            // other eligible ε-cells exist
08       wp(k) = arg max E_α^0       // pick the ones with max potential
              α^0 ∈ D^0
09    else if E_wp(k−1) > 0 then      // pre-computed waypoint still available
10       wp(k) = wp(k−1)
11    else wp(k) = ∅;                 // local extremum detected at level 0
12 end
13 if q = CP', 1 ≤ l ≤ L then
14    compute D'                      // form the computing set D' using Equation (4)
15    if D' ≠ ∅ then                  // coarse cells with positive potentials exist
16       wp(k) = I (arg max E_α')
              α' ∈ D'
17    else wp(k) = ∅;                 // no waypoint found at level l
18 end
```

Waypoint Computation:

First, the ETM can form a computing set $D^0 \subseteq N^0(\lambda)$ (Line 02 of Algorithm 1) that consists of "eligible" ε-cells for the next waypoint. An ε-cell is considered eligible if the ε-cell is: i) "directly reachable", i.e. it is not behind an obstacle, and ii) "unexplored" i.e. it has positive potential. More particularly, an ε-cell can be called directly reachable from λ if a line segment joining the centroids of λ and the ε-cell is not obstructed by any obstacle cell. Then, a "directly reachable set" DR(λ) can be determined as the set of all directly reachable cells in $N^0(\lambda)$.

The computing set $D^l$ can be determined using Equation (4):

$$D^l = \begin{cases} \{\alpha^l \in N^{l0}(\lambda): E_{\alpha^0} > 0, \alpha^0 \in DR(\lambda)\}, & \text{if } l = 0 \\ \{\alpha^l \in N^l(\lambda): E_{\alpha^l} > 0\}, & \text{if } l \geq 1 \end{cases} \quad (4)$$

Equation (4) indicates that $D^0$ contains eligible ε-cells, while $D^l$, $1 \leq l \leq L$, contains eligible coarse cells with positive potentials, implying that the eligible coarse cells contain unexplored ε-cells. The sets $D^l$, $1 \leq l \leq L$ are used in the CP states later. Note that the direct reachability condition is only enforced at Level 0 to prevent unnecessary distortions in the back and forth trajectory. At higher levels, the algorithm can use a technique to reach the cells behind obstacles, such as Bug2.

Next, if the current cell λ is unexplored, i.e. $\lambda \in D^0$ (Line 03 of Algorithm 1), then the ETM can further check if the cell above ($\lambda^{up}$) and the cell below ($\lambda^{down}$) both belong to $D^0$ (Line 04 of Algorithm 1). This condition tests whether the autonomous vehicle is in the middle of unexplored cells both above and below λ. If the autonomous vehicle is in the middle of unexplored cells both above and below λ, then the autonomous vehicle should rather first move to a cell that is adjacent to a forbidden or explored cell. This movement condition is imposed such that the trajectory is not distorted by tasking in the middle of unexplored cells, and allows for maintaining a back and forth motion. Thus, the waypoint candidate set wp is chosen as wp=$(\lambda^{down}, \lambda^{down})$ (Line 05 of Algorithm 1). The autonomous vehicle can picks a waypoint from the waypoint candidate set wp based on the autonomous vehicle's turn and travel costs as per Equation (5), which is discussed below. After computing the waypoint candidate set wp, the ETM can loop in state q=$CP^0$ and send the output vector $o_{p_3}$ to move the autonomous vehicle to the next waypoint.

If $\lambda$ is unexplored and the cells above and below are not both unexplored (Line 06 of Algorithm 1), then the autonomous vehicle is well positioned for tasking. Then, the waypoint candidate set is set equal to $\lambda$ and the ETM transitions to the state q=WT while sending an output vector $o_{p_2}$ commanding the autonomous vehicle to task at $\lambda$. The operation of the ETM while in state WT is described later.

If the current cell $\lambda$ is not unexplored but there exist other eligible ε-cells in $D^0$ (Line 07 of Algorithm 1), then the waypoint candidate set wp can be selected to include ε-cells that have the highest potential in $D^0$ (Line 08 of Algorithm 1). Note that there could be more than one ε-cell with the highest potential, if these ε-cells belong to an equipotential surface. Finally, if $D^0=\emptyset$, but a pre-computed waypoint wp(k-1) is still accessible, such that $E_{wp(k-1)}>0$ (Line 09 of Algorithm 1), then the waypoint candidate set wp remains the same (Line 10 of Algorithm 1). If a waypoint candidate set wp is obtained from the above steps, then the ETM stays in state q=$CP^0$ and sends the output vector op with a command to move the autonomous vehicle to the next waypoint, as can be seen in FIG. 4.

It is possible that that waypoint candidate set wp contains more than one element. In that case, the autonomous vehicle can select an ε-cell with the least total travel and turn cost to reach that ε-cell from $\lambda$. Let the current position of the autonomous vehicle be $(\lambda_x, \lambda_y) \in \tau_\lambda$. Then, for each $\mu \in wp$, a cost $C_{\mu, \lambda}$ is defined as the total travel and turn cost needed to reach the centroid $(\mu_{x_c}, \mu_{y_c})$ of the ε-cell $\tau_\mu$ such that $$C_{\mu,\lambda} \triangleq d_{\mu,\lambda} C_{Tr} + \theta_{\mu,\lambda} C_{Tu} \quad (5)$$

where $C_{Tr}$ is the cost of traveling per unit distance; $C_{Tu}$ is the cost of turning per degree from the heading angle $\theta_h$; and $d_{\mu,\lambda} = \|(\mu_{x_c}, \mu_{y_c}) - (\lambda_x, \lambda_y)\|_2$ and $$\theta_{\mu,\lambda} = \left|\theta_{(\mu_{x_C}, \mu_{y_c})} - \theta_h\right|$$

are the distance and the turning angle, respectively.

ETM Operation in the $CP^l$ State $1 \leq l \leq L$:

Although the ETM usually cycles between $CP^0$ and WT states, the condition $D^0=\emptyset$ may be true and a pre-computed waypoint may also not be available since $E_{wp(k-1)} \leq 0$. Then, the waypoint candidate set wp=$\emptyset$ (Line 11) and the ETM is said to be in a local extremum.

Escaping from the Local Extremum:

As shown in FIG. 4, when wp=$\emptyset$, the ETM can transition to the computing state q=$CP^1$ and the single tape head of the ETM can move to Level 1 on the MAPS. Then, the single tape head of the ETM can point at the coarse cell containing the current ε-cell $\lambda$. The ETM can then read a potential surface $E_{N^1(\lambda)}$ in the local neighborhood $N^1(\lambda)$ including the coarse cell containing the current ε-cell $\lambda$, and form the computing set $D1 \subseteq N^1(\lambda)$ (Line 14 of Algorithm 1). If there exist coarse cells with positive potentials (Line 15 of Algorithm 1), then the ETM can first picks the coarse cell with the highest potential in $D^1$. Subsequently, a function I(·) can randomly select an unexplored ε-cell within in the coarse cell with the highest potential in $D^1$ and assign the unexplored ε-cell to waypoint candidate set wp (Line 16 of Algorithm 1).

However, it may happen that even at level l=1, $\nexists \alpha^1 \in N^1(\lambda)$ with positive potential, then the waypoint candidate set wp=$\emptyset$ (Line 17 of Algorithm 1). In this case, the ETM can transition to the computing state q=$CP^2$ and the single tape head of the ETM can move to Level 2 on the MAPS. The ETM can continue looking for a waypoint with positive potential on each level of the MAPS using Lines 13-17 of Algorithm 1 until the ETM finds the lowest level $l \in \{1, \ldots, L\}$ where $D^l \neq \emptyset$. Once the ETM finds a waypoint with positive potential, the ETM can switch back to the state q=$CP^0$ and send output vector $o_{p_3}$ to move the autonomous vehicle to that waypoint. If the ETM is unable to find a coarse cell with positive potential even at the highest Level L, it implies that no coarsest cell contains any unexplored ε-cell. In that case, the ETM can switch to state q=FN and send the output vector $o_{p_4}$ commanding the autonomous vehicle to stop its machinery as the coverage path is complete.

ETM Operation in the WT State:

The ETM comes to the state q=WT from the state q=$CP^0$ if the waypoint candidate set wp=$\lambda$. The ETM can wait in the WT state while the autonomous vehicle performs a task at $\lambda$ and reports back the task status via input vector $i_{p_2}$. If input vector $i_{p_2}$ includes a task status ts of "Complete", then the ETM can update a symbolic state of the current cell to "E" as having been explored, and the current cell can be assigned with 0 potential according to Equation (2). Subsequently, the potential surfaces $E^l$, $\forall l \in \{1, \ldots, L\}$ are updated according to Equation (3). This MAPS update process can be represented as $E^l \leftarrow E$, $\forall l \in \{0, \ldots, L\}$.

Then, the ETM can transition back to the computing state q=$CP^0$ and resume searching for a new waypoint. If the task is not completed yet then the ETM can loop in the state q=WT, while sending the output vector $o_{p_3}$ to continue tasking the autonomous vehicle. In states $CP^0$ and WT, the MAPS can be updated by assigning -1 and 0 potentials to obstacle and explored regions, respectively. In unexplored regions, the MAPS can maintain the positive potentials defined by B, as shown in FIG. 3. Since a waypoint is often chosen as the ε-cell in the neighborhood with the highest positive potential, maintaining the positive potentials defined by B enables tracking the highest equipotential surfaces of B to produce a desired back and forth motion.

In some examples, the ETM can use a floodfill algorithm to fill unexplored cells inside a closed obstacle with the obstacle symbol O, when the boundary of the obstacle is detected but interior is not detected. This prevents the ETM from trying to pick undetected cells inside large obstacles. In some examples, at higher levels, if a computed waypoint is behind an obstacle, then the autonomous vehicle can use any existing shortest path algorithm to reach the computed waypoint; e.g., the Bug2 algorithm.

Theorem 1:

The ETM halts in finite time.

Proof:

From the ETM state transition graph in FIG. 4, we see that the ETM halts when q=FN. The ETM state transition graph in FIG. 4 also indicates that there are two kinds of cycles in the graph: i) between $CP^0$ and WT states, where the primary operation in these states is to compute wp and check task status ts, respectively; and ii) between $CP^0$ and $CP_l$, $1 \leq l \leq L$, states, where the primary operation in any of these states is to compute the waypoint candidate set wp. Since the computing set $D_l$ is used to compute the waypoint candidate set wp in any $CP_l$ state, and the tasking time spent in WT state, are both finite; therefore, the total time spent in each cycle is finite. Further, during execution of these cycles, the unexplored ε-cells with state U are constantly flipped to states O, F, or E accordingly. This implies that the probabilities $p_{\alpha^l}^U(k)$, $\forall$ $\alpha^l \in \{1, |T^l|\}$, $\forall l \in \{1, \ldots, L\}$ decrease monotonically. Thus, $\exists$ a finite $K \in Z^+$, such that $p_{\alpha^l}^U(K) = 0$. This in turn implies that $E_{\alpha^l}(K) = 0$ as per Equation (3). Therefore, at time K, $D^l = \emptyset$, $\forall l \in \{1, \ldots, L\}$ as per Equation (4); hence, wp(K) = $\emptyset$. Thus, at time K the ETM will exit from all cycles and transition to the FN state, which causes the ETM to halt.

Since $D^l = \emptyset$ upon halting, ε-coverage is achieved.

Corollary 1:

Each allowed ε-cell is tasked only once.

Proof:

From Theorem 1, the ETM achieves ε-coverage in finite time, thus, as each allowed cell is tasked, the allowed cell's symbolic state will be set to "E" (explored) as the task completes, and the allowed (and now explored) cell's potential is updated to 0. Therefore, according to Algorithm 1, the allowed (and now explored) cell will never be assigned to the waypoint candidate set wp, and the hence the allowed (and now explored) cell cannot be tasked again. Thus, every allowed cell is tasked only once.

Computational Complexity:

The ε-STAR algorithm has fairly low computational complexity and is real-time implementable. Suppose the local neighborhood $N^0(\lambda)$ contains N ε-cells. Similarly, suppose the local neighborhood $N^l(\lambda) \forall l \geq 1$, contains MCC coarse cells. The ETM first searches in the local neighborhood at Level 0 to find navigation waypoints. The ETM only switches to higher levels than Level 0 if the ETM is stuck in a local extremum. Thus, for Level 0 decisions the algorithm has a complexity of O(N); and even in the worst case, when the ETM has to go to the highest Level L to make a decision, the complexity is ~O(N+L*MCC). Since the coarse cells at higher levels contain mean potentials of all unexplored ε-cells within them, this bottom-up hierarchical approach to escape from a local extremum avoids searching for an exponentially increasing number of ε-cells; thus significantly reducing the complexity.

The ε-STAR algorithm has been validated by simulations as well as experiments and its performance is compared with other algorithms. ε-STAR algorithm validation was performed using simulation runs on a high-fidelity robotic platform called Player/Stage. The robot server Player provides a software base whose libraries contain models of different types of robots, sensors, and actuators. On the other hand, Stage is a highly configurable robot simulator. In this paper, a Pioneer 2AT robot of dimensions 0.44 m×0.38 m×0.22 m was simulated with kinematic constraints such as the top speed 0.5 m/s, maximum acceleration 0.5 m/s², and the minimum turn radius 0.04 m. It was equipped with a laser sensor with a detection range of 4 m, having 16 beams located around the robot to detect obstacles. A 3.40 GHZ CPU computer with 16 GB RAM was used for simulations. Several complex scenarios of 50 m×50 m search areas with different obstacle layouts were drawn and partitioned into a 50×50 tiling structure consisting of 1 m×1 m ε-cells. This resulted in an MST with L=5. For computation, the neighborhood was chosen to contain 7×7 cells at the lowest level and 3×3 cells at higher levels. The simulations were run 8 times faster than the real-time speed.

Figure 5:
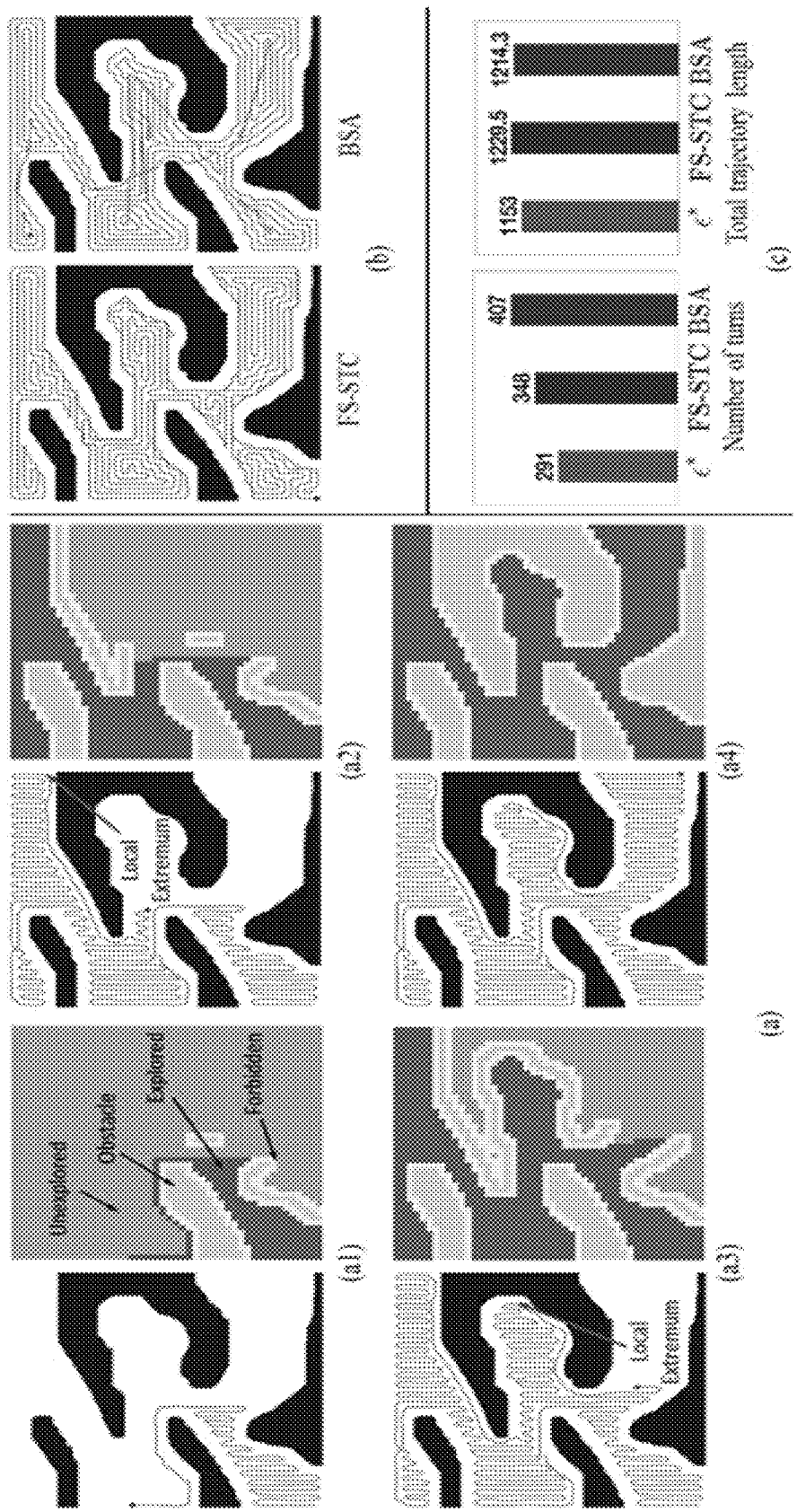
FIG. 5 depicts a scenario with a complex environment with arbitrary obstacles, in accordance with example embodiments.
Figure 6:
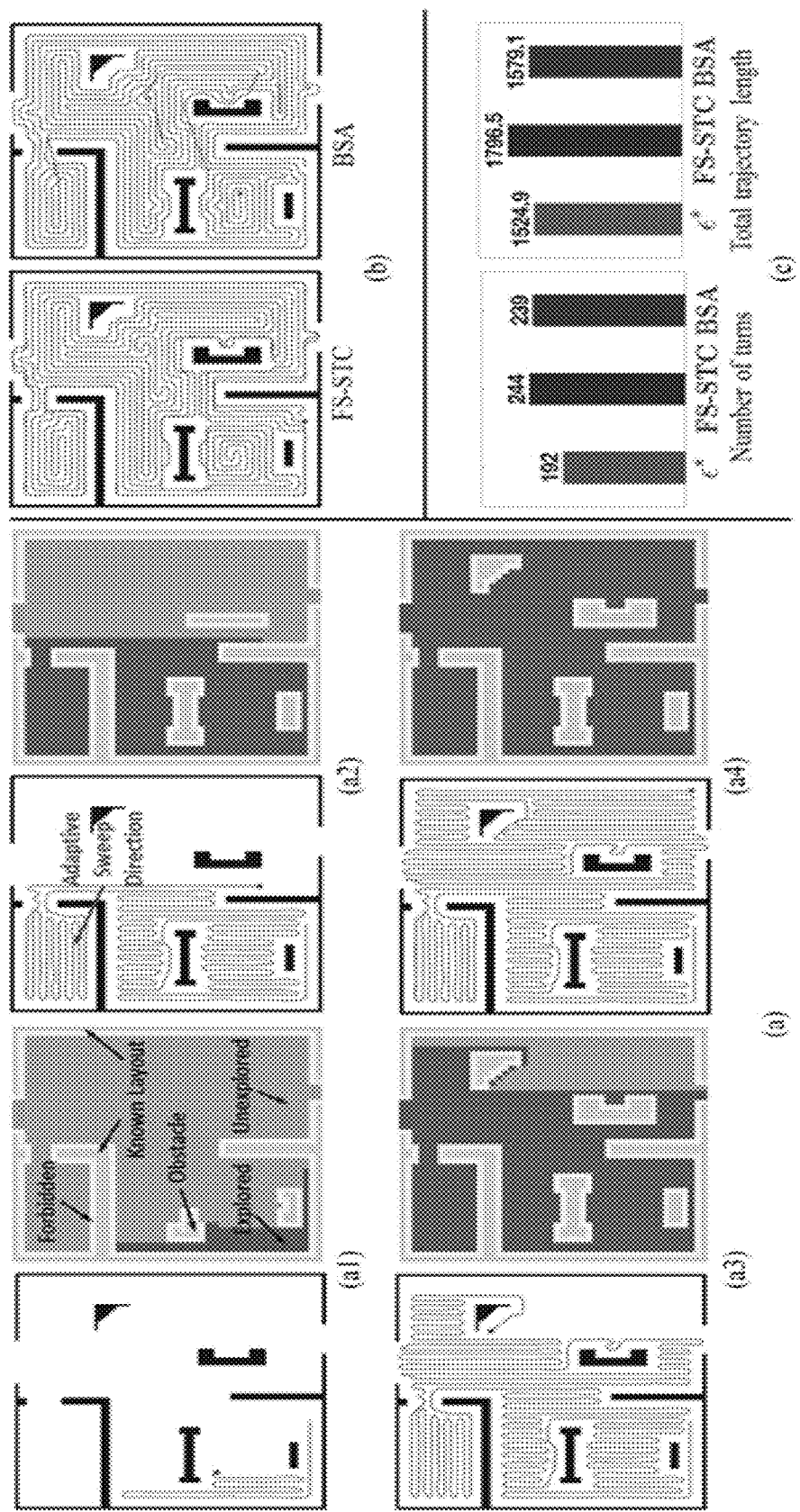
FIG. 6 depicts a scenario with a house having several rooms and structures, in accordance with example embodiments.

FIG. 5 depicts a scenario with a complex environment with arbitrary obstacles, in accordance with example embodiments, and FIG. 6 depicts a scenario with a house having several rooms and structures, in accordance with example embodiments. FIGS. 5 and 6 show results of the ε-STAR algorithm for these two different scenarios in comparison with two other online CPP algorithms: FS-STC and BSA.

Three metrics are used for performance evaluation in the scenarios of FIGS. 5 and 6: i) coverage ratio $$r_c = \frac{\bigcup_k \tau(k) \cap R(T^a)}{R(T^a)},$$

ii) number of turns, and iii) trajectory length. FIGS. 5a1, 5a2, 5a3, and 5a4 and FIGS. 6a1, 6a2, 6a3, and 6a4 show snapshots of a trajectory generated by the ε-STAR algorithm during each respective scenario at four different instants and images of corresponding symbolic encodings. These snapshots show several instances when the autonomous vehicle gets stuck into a local extremum, surrounded by either obstacle or explored cells in the local neighborhood. In each such instance, the autonomous vehicle successfully comes out of the local extremum using higher levels of MAPS and finally achieves complete coverage. Since the autonomous vehicle sees only the periphery of large obstacles, the floodfill algorithm is used by the ETM at regular intervals to fill the interiors of all closed obstacles.

The scenario of FIG. 6 tested another condition where a priori knowledge was available and if that knowledge could be used to adapt the sweep direction of the autonomous vehicle. In the scenario of FIG. 6, a blue-print of a house (i.e. interior walls but not interior obstacles, such as furniture) was assumed to be known and that knowledge used to generate a coverage path for the house. Then, it was assumed that the layouts of all rooms are known but the inside obstacles are unknown. The field B was designed in a manner such that the autonomous vehicle sweeps the top left room horizontally while the other two rooms vertically, as seen in FIG. 6a2. These sweep directions enable reducing the total number of turns.

FIGS. 5b and 6b show the trajectories of FS-STC and BSA algorithms for the respective scenarios. The trajectories of FS-STC and BSA algorithms are spiral in contrast to the back and forth trajectories generated by ε-STAR algorithm. FIGS. 5c and 6c compare the number of turns and total trajectory length. The ε-STAR algorithm produces significantly less number of turns and shorter trajectory lengths. The average computation time to update the waypoint candidate set wp in state $CP^0$ was about 0.577 milliseconds, while it was about 0.437 milliseconds in any $CP^l$, $1 \leq l \leq L$ state; hence it is suitable for real-time applications. Table II provides the qualitative comparison between the features of the ε-STAR and other online algorithms.

TABLE II

Comparison of Key Features of ε-STAR with Other Algorithms

| | ε-STAR Algorithm | FS-STC Algorithm | BSA Algorithm | Cellular Decomposition Algorithm |
|---|---|---|---|---|
| Environment | Any | Any | Any | Non-rectilinear |
| Path Pattern | Back and forth with adjustable sweep direction in known areas | Spiral | Spiral | Back and forth |
| Approach | Uses ETM as a supervisor | Circumvents a spanning tree constructed | Uses spiral paths to fill areas and backtracking to escape spiral endings. | Relies on critical point detection for Morse decomposition and uses Reeb graph and cycle algorithm. |

Figure 7:
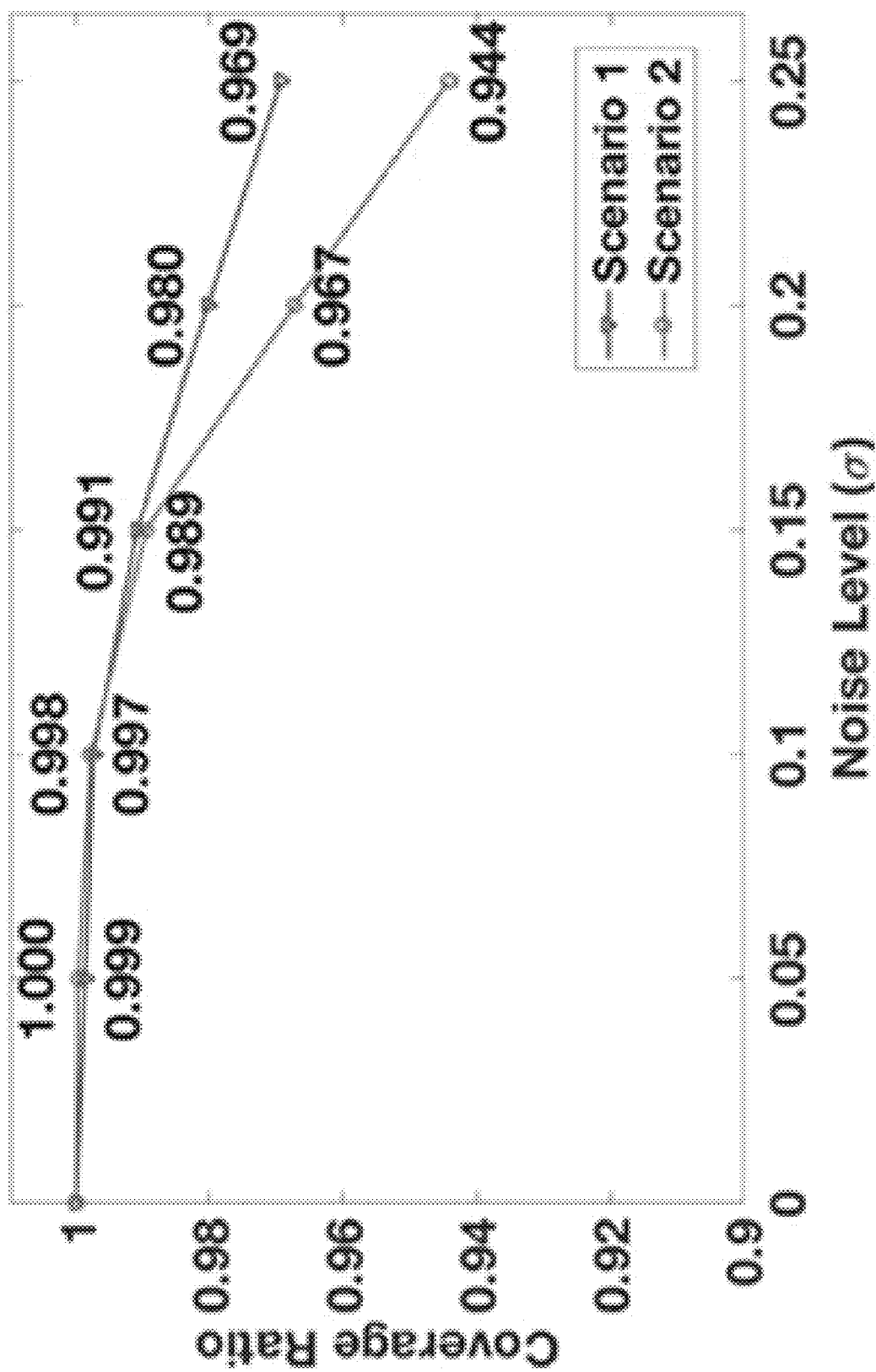
FIG. 7 shows a graph of coverage ratio versus noise, in accordance with example embodiments.

Performance in Presence of Uncertainties:

To perform an uncertainty analysis for the ε-STAR algorithm, noise was injected into the measurements of the range detectors (lasers), the heading angle (compass), and the localization device of the autonomous vehicle. A laser sensor typically admits an error of 1% of its operation range. Similarly, a modestly priced compass can provide heading information as accurate as 1°. The above errors were simulated with Additive White Gaussian Noise (AWGN) with standard deviations of $\sigma_{laser}=1.5$ and $\sigma_{compass}=0.5°$, respectively. The Hagisonic StarGaze indoor localization system provides a precision of 2 cm while the localization device using Real-Time Kinematic (RTK) can achieve an accuracy of 0.05 to 0.5 m. Thus, the uncertainty due to localization system is studied using AWGN with standard deviation ranging from $\sigma=0.05$ m to 0.25 m. FIG. 7 shows the average coverage ratio vs. noise over ten Monte Carlo runs for the two scenarios.

Validation by Real Experiments:

A prototype using the ε-STAR algorithm has been developed using an iRobot Create as an autonomous vehicle. Experiments have been conducted in a laboratory setting to validate the effectiveness and efficiency of the ε-STAR algorithm, showing complete coverage of a room with back and forth motion of a coverage path generated using the herein-described techniques.

A laboratory area for these experiments was partitioned into an 8×8 tiling structure with each ε-cell of dimension 0.61 m. This resulted in a multiscale tiling with L=2. Forbidden regions were not defined due to limited laboratory space. For computation a neighborhood of size 3×3 was chosen at all levels.

An iRobot Create was utilized as an autonomous vehicle that was equipped with the Hagisonic StarGazer system acting as an indoor localization device, the HOKUYO URG-04LX scanning laser with a ~2 m detection range acting as a range detector, and 10 ultrasonic sensors evenly placed around the autonomous vehicle for collision avoidance. Table III provides the specifications of these sensing systems.

Figure 8:
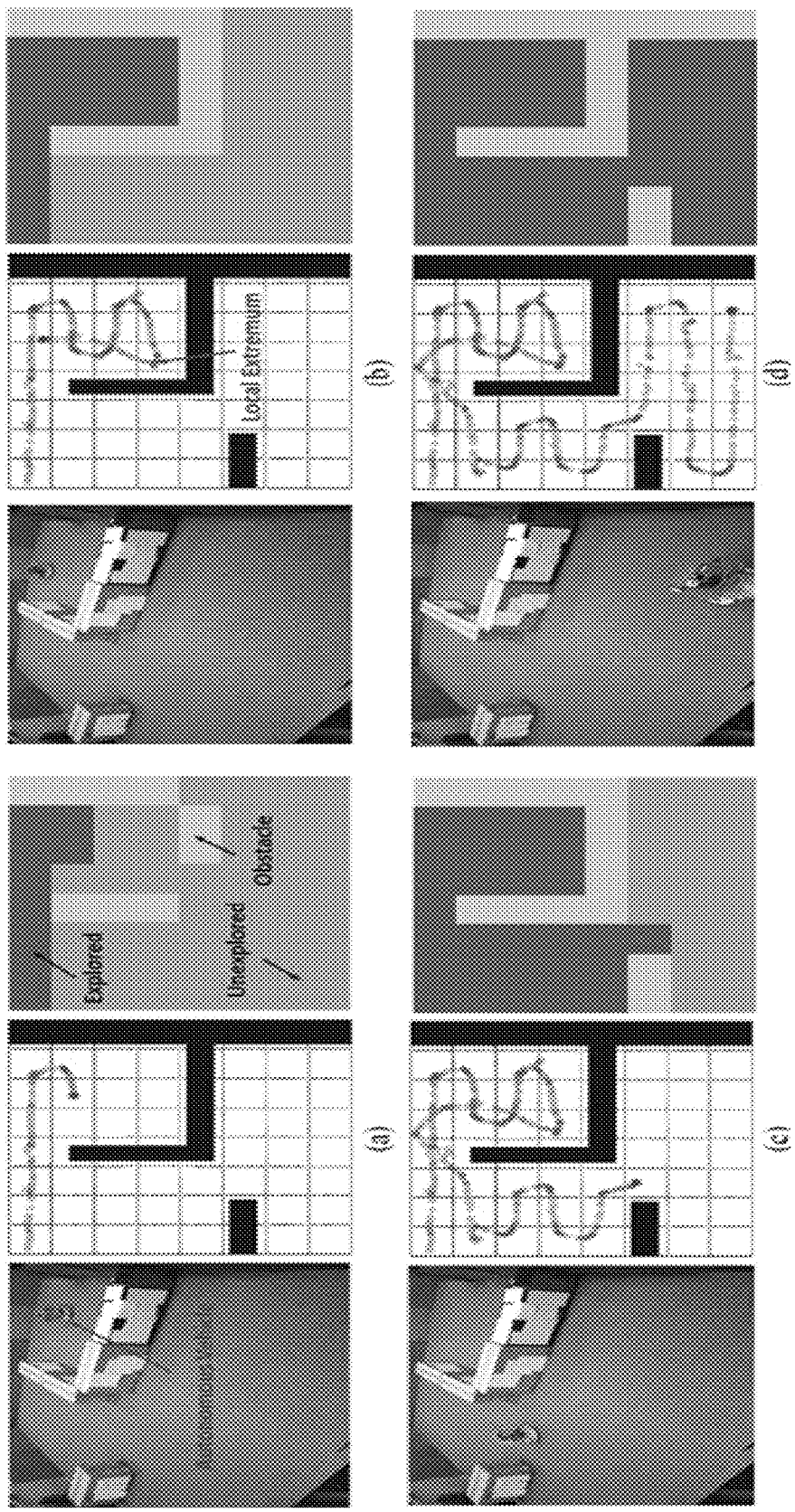
FIG. 8 illustrates a real experiment in a laboratory environment, in accordance with example embodiments.

A hardware-in-the-loop setup was established, where the autonomous vehicle carries an onboard laptop that runs the Player, which acts as the server to collect the real-time sensor measurements. The autonomous vehicle stops every few seconds to collect data. The client computer runs the ETM which incrementally builds the map by real-time obstacle discovery. The server and the client communicate through a wireless connection for realtime control and navigation. FIG. 8 shows the results of a real experiment, where the autonomous vehicle successfully evacuated from a local extremum and explored different rooms to achieve ε-coverage, thus revealing the effectiveness of the ε-STAR algorithm.

A comparison of the herein-described techniques utilizing the above-mentioned prototype was performed with respect to a particular prior method. FIGS. 9A and 9B compare paths used to cover an example region, where FIG. 9A depicts a first prior path covering the example region generated by the particular prior method, and FIG. 9B depicts a first example path covering the example region generated by the herein-described techniques. The same example region is shown in both FIGS. 9A and 9B—in both of these depictions of the region, shaded regions represent occupied space and white regions represent unoccupied space. For example, the example region depicted in FIGS. 9A and 9B can be a room bounded by walls with an obstacle, such as a piece of furniture, in the room.

A comparison of FIG. 9A with FIG. 9B shows that the first example path (shown in FIG. 9B) covering the example region generated by the herein-described techniques is beneficially relatively-shorter, and has relatively fewer turns than the first prior path (shown in FIG. 9A).

Also, FIG. 9A shows that the first prior path has two local extrema, while the first example path of FIG. 9B has zero local extrema. In this example, FIG. 9B illustrates that the herein-described techniques can generate the first example path without local extrema; however, the first prior path has

TABLE III

Specifications of Onboard Sensing Systems

| | Localization Device | Range Detectors | Ultrasonic Sensors |
|---|---|---|---|
| Model | StarGazer | URG-04LX scanning laser | XL-MaxSonar-EZ |
| Range | — | 0.02-5.6 m, 240° | 0.2-7.65 m |
| Resolution | 10 mm, 1° | 1 mm, 0.36° | 10 mm |
| Accuracy | 20 mm, 1° | ±1% of measurement | — | two local extrema. That is, the first example path advantageously both avoids local extrema and has two fewer local extrema than the first prior path.

Figure 10B:
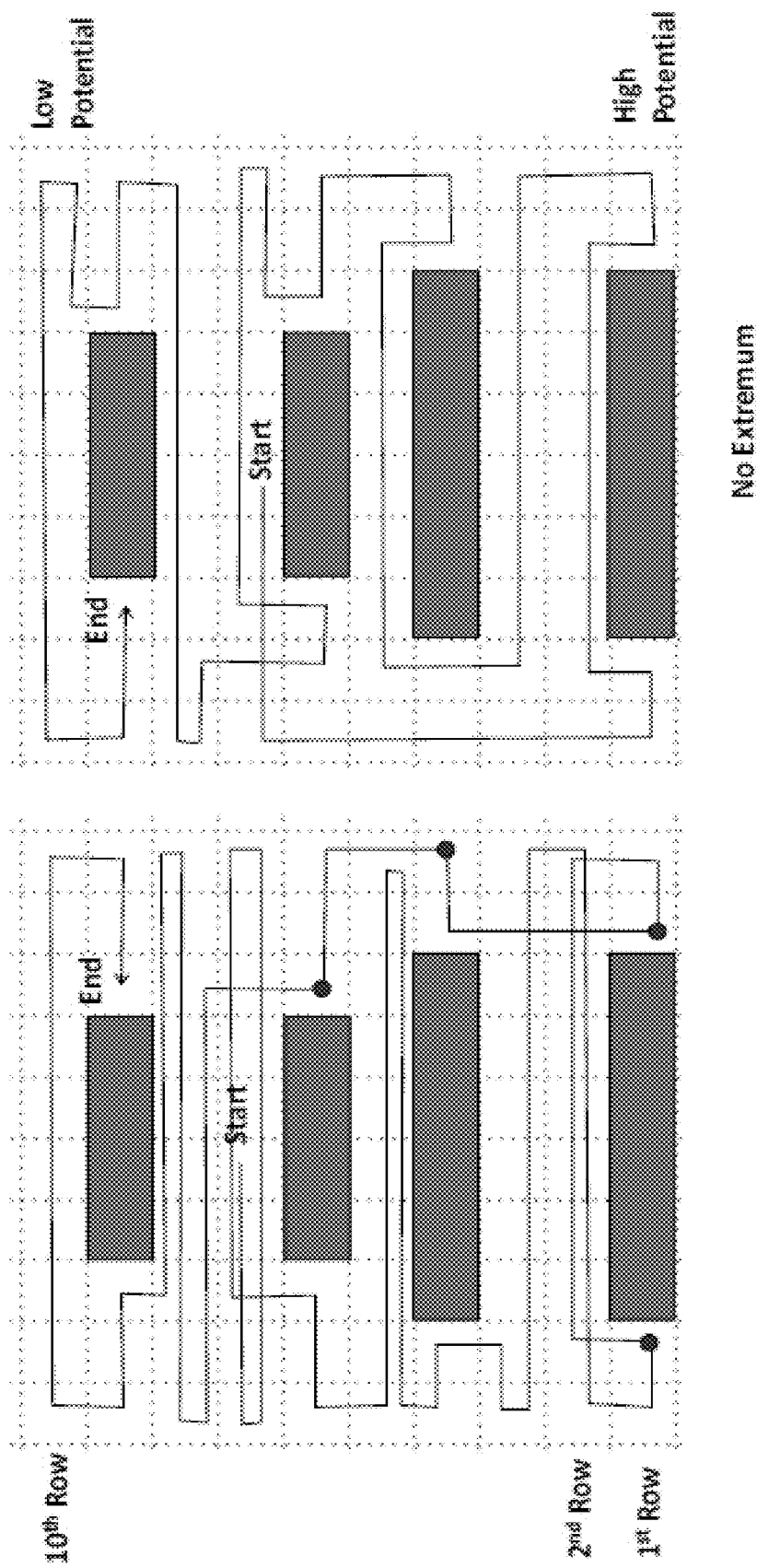
FIG. 10B shows a path in the example region of FIG. 10A, in accordance with example embodiments.

FIGS. 10A and 10B compare paths used to cover an example region, where FIG. 10A depicts a second prior path covering the example region generated by the particular prior method, and FIG. 10B depicts a second example path covering the example region generated by the herein-described techniques. The same example is shown in both FIGS. 10A and 10B—in both of these depictions of the region, shaded regions represent occupied space and white regions represent unoccupied space. For example, the example region depicted in FIGS. 10A and 10B can be a relatively-small warehouse or storeroom having four rows of stored materials.

A comparison of FIG. 10A with FIG. 10B shows that the second example path (shown in FIG. 10B) covering the example region generated by the herein-described techniques is beneficially relatively-shorter, and has relatively fewer turns than the second prior path (shown in FIG. 10A). Also, FIG. 10A shows that the second prior path has four local extrema, while the second example path of FIG. 10B has zero local extrema. Thus, the second example path advantageously both avoids local extrema and has four fewer local extrema than the second prior path.

FIGS. 11A and 11B compare paths used to cover an example region, where FIG. 11A depicts a third prior path covering the example region generated by the particular prior method, and FIG. 11B depicts a third example path covering the example region generated by the herein-described techniques. The same example region is shown in both FIGS. 11A and 11B—in both of these depictions of the region, shaded regions represent occupied space and white regions represent unoccupied space. For example, the example region depicted in FIGS. 11A and 11B can be a relatively-large warehouse or storeroom having six columns and two rows of stored materials, with one row of stored materials broken by two regions of unoccupied space.

A comparison of FIG. 11A with FIG. 11B shows that the third example path (shown in FIG. 11B) covering the example region generated by the herein-described techniques is beneficially relatively-shorter, and has relatively fewer turns than the third prior path (shown in FIG. 11A). Also, in the relatively-complex environment shown in FIGS. 11A and 11B, FIG. 11A shows that the third prior path has seven local extrema, while the third example path of FIG. 11B has one local extremum which was overcome using MAPS. That is, even though the third example path does have one local extremum, the herein-described techniques can prevent the local extremum from stopping a vehicle at the local extremum by finding new waypoints for the autonomous vehicle and so the autonomous vehicle will avoid being stuck during operation. As such, the third example path both has six fewer local extrema than the third prior path and herein-described techniques can advantageously prevent a vehicle from being stuck at the remaining local extremum.

Table IV below further illustrates differences between the particular prior method and the herein-described techniques.

TABLE IV

| Comparative Feature | Particular Prior Method | Herein-Described Techniques |
| --- | --- | --- |
| Path Pattern | The particular prior method generates the back-and-forth coverage path with many repeated trajectories. The particular prior method behaves like filling water to a cup, but it fills from top to bottom. The particular prior method starts traveling and cleaning in the middle of a region. Whenever the particular prior method enters a whole unexplored row in the middle, the particular prior method will first go to the leftmost cell and clean along the path, then to the rightmost until reaching an obstacle or boundary. Then, the particular prior method will go somewhere in the lower row by traveling on the current row again. This means the particular prior method can duplicate travel several times in the same row for cleaning and potentially take many turns. | The herein-described techniques generate desirable back-and-forth coverage paths. The herein-described techniques behave like filling water to a cup, but it fills from bottom to top. When the herein-described techniques started in the middle of a row, the herein-described techniques do not clean in the middle but first travel to a boundary, thus protecting a trajectory pattern. Also, by exploring space from bottom to top, the herein-described techniques can avoid unnecessary local extremum at the bottom (e.g., see FIGS. 9A-11B). |
| Local Extrema | The particular prior method does not provide a clear strategy how to evacuate from local extrema. Potentially, the particular prior method can require significant computational resources to scan a whole environment to find yet unexplored cells. | The herein-described techniques use a hierarchical mapping to evacuate from local extrema while avoiding searching the whole environment to find yet unexplored cells. |
| Adaptive Sweep Direction | For scenarios containing long corridors orienting in both horizontal and vertical directions, the particular prior method will generate a zig-zag path with numerous turns; e.g., as shown in FIG. 11A. | The herein-described techniques use a controllable sweep direction to reduce a number of turns. For example, when applied to floor cleaning, if the rectangular shapes of some rooms are known to the planner, then the herein-described techniques can be adjusted so that an autonomous system |

TABLE IV-continued

| Comparative Feature | Particular Prior Method | Herein-Described Techniques |
|---|---|---|
| | | generates a back-and-forth coverage path to clean a room along a long edge to further reduce the number of turns. |
| Computational Complexity/ Resources | The particular prior method typically scans row by row, requiring information of a whole row to confirm the completion of the row. Then, the particular prior method needs information from all rows below a current row to compute an entrance point to a row below the current row (if there are any unexplored cells below the current row). | The herein-described techniques computes new waypoints using only information from a neighborhood of points, leading to fairly low computational complexity and resource requirements. The herein-described techniques are suitable for real-time implementations. |
| Control Structures | The particular prior method produces waypoints without explicit operational commands (i.e., start/ stop cleaning commands), which can be inflexible and inefficient (e.g., moving over an already cleaned location without ceasing to clean while moving). | The herein-described techniques have a built in supervisory control structure where an Exploratory Turing Machine (ETM) can take sensor feedback from an autonomous system and provides the autonomous system with navigational guidance (i.e., waypoints) and operational commands (i.e., task, move, idle, stop) in real-time. Thus, the herein-described techniques are convenient for implementation on real vehicles. |

Figure 12:
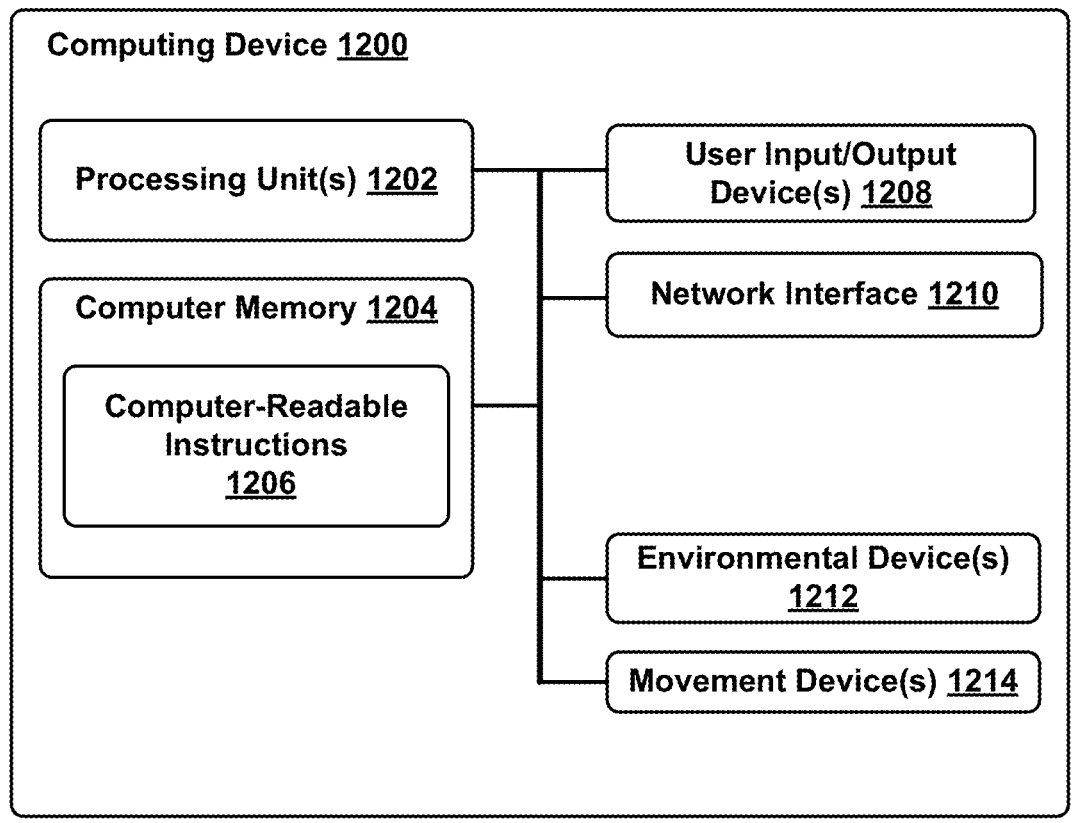
FIG. 12 is a block diagram of a computing device, in accordance with example embodiments.

FIG. 12 is a block diagram of computing device 1200, in accordance with example embodiments. In particular, computing device 1200 shown in FIG. 12 can be configured to perform at least one feature of the herein-described techniques, at least one feature of the above-mentioned claims, at least one feature disclosed in the attached FIGS. and/or at least one feature of: an autonomous vehicle, a robotic device, a CPP algorithm, the ε-STAR algorithm, an ETM, MAPS, coverage path planning, and/or method 1300.

Computing device 1200 may include one or more interconnected processing units 1202, computer memory 1204, one or more user input/output devices 1208, a network interface 1210, one or more environmental devices 1212, and/or one or more movement devices 1214.

One or more processing units 1202 can include one or more central processing units (CPUs), graphics processing units (GPUs), mathematical co-processors, application-specific integrated circuits (ASICs), general purpose processing units, and/or special purpose processing units. Processing unit(s) 1202 can be configured to execute stored instructions, such as computer-readable instructions 1206 stored in computer memory 1204, to carry out one or more functions, tasks, and/or operations. For example, the one or more functions, tasks, and/or operations can include, but are not limited to, one or more functions, tasks, and/or operations of the herein-described methods, scenarios, techniques and/or apparatus.

Computer memory 1204 can include one or more apparatus for storing information at computing device 1200. For example, computer memory 1204 can store computer-readable instructions 1206 and related data. Computer memory 1204 can store other information as well.

The apparatus for storing information can include computer storage media, including but not limited to, random access memory (RAM), read-only memory (ROM), volatile memory, non-volatile memory, removable memory, flash memory, cache memory, associative memory, magnetic memory, optical memory, organic memory, and/or memory based on other storage technologies. For example, computer memory 1204 can provide enough storage to enable computing device 1200 to perform one or more functions, tasks, and/or operations of the herein-described methods, scenarios, techniques and/or apparatus.

User input/output devices 1208 can include one or more apparatus for receiving input at computing device 1200 and/or providing output of computing device 1200, such as receiving input from and/or providing output to one or more users of computing device 1200 and/or to one or more computing devices connected to computing device 1200. Example apparatus for receiving input at computing device 1200 include, but are limited to, keyboards, touch screens, touch pads, microphones, sound detectors, computer mice, joysticks, buttons, cameras, bar code readers, and quick response (QR) code readers. Example apparatus for providing output of computing device 1200 include, but are limited to, light emitting diodes (LEDs), organic light emitting diodes (OLEDs), liquid crystal displays (LCDs), cathode ray tubes (CRTs), monitors, physical screens, bulbs, loudspeakers, headphones, earphones, audio and/or video output jacks, alarms, and/or haptic devices.

Network interface 1210 can include one or more apparatus that enable computing device 1200 to communicate information with one or more other computing devices; e.g., via one or more data networks. Example apparatus that enable computing device 1200 to communicate with one or more other computing device can include, but are not limited to, wireless-communication apparatus, wired-communication apparatus, data and/or voice transceivers, data and/or voice transmitters, cables, data and/or voice receivers, cable, wires, and repeaters. The apparatus that enable computing device 1200 can communicate with one or more other computing devices using one or more communications protocols, including but not limited to: one or more wired-communication protocols (e.g., a Universal Serial Bus (USB) protocol, an Ethernet protocol) for wired communication with computing devices and/or one or more wireless-communication protocols (e.g., a Bluetooth® protocol, a Wi-Fi™ protocol, a Zigbee® protocol).

Network interface 1210 can be configured to communicate compressed and/or decompressed information with one or more other computing devices. Also, network interface 1210 can be configured to communicate encrypted and/or decrypted information with one or more other computing devices. In some examples, computing device 1200 can be configured to compress, decompress, encrypt, decrypt, secure, and/or otherwise optimize communications with one or more other computing devices.

Environment devices 1212 can include one or more devices that enable computing device 1200 to obtain information related to an environment of computing device 1200. Such information related to an environment surrounding computing device 1200 can include, but is not limited to, temperature information, location information, movement information (e.g., speed, movement direction, velocity, acceleration), wind information, light information, sound information, vibration information, chemical information, biological information, and radiation information. As such environment devices 1212 can include, but are not limited to one or more: localization devices, Global Positioning System (GPS) devices, range detectors, thermometers, gyroscopes, compasses, laser location devices, speedometers, accelerometers, cameras, optical sensors, microphones, task-specific sensors, sonar sensors, radar sensors, infrared sensors, ultraviolet sensors, motion sensors, proximity sensors, magnetic sensors, smoke detectors, chemical sensors, biological sensors, and/or radiation sensors.

Movement devices 1214 can include one or more devices that enable computing device 1200 to move in an environment surrounding computing device 1200. Movement devices 1214 can enable computing device 1200 to move part or all of computing device 1200 in the environment and/or to move one or more objects in the environment. For example, movement devices 1214 can include, but are not limited to, one or more: actuators, wheels, axles, tools, tracks, graspers, mechanical hands, mechanical feet, mechanical limbs, solenoids, motors, cylinders, hydraulic actuators, pneumatic actuators, electric actuators, electromechanical actuators, mechanical actuators, thermal actuators, and/or magnetic actuators. In some examples, movement devices 1214 can enable computing device to perform at least movement-related aspects of the herein-described functionality of an autonomous vehicle and/or a robotic device.

FIG. 13 is a flowchart of method 1300, in accordance with example embodiments. In some examples, method 1300 can be carried out using a computing device such as computing device 1200. In some of these examples, the computing device can be configured to perform some or all of the functions of the ε-STAR algorithm, including but not limited to, some or all of the functions of the herein-described ETM. In some of these examples, method 1300 can be carried out using a computing device that is part of or otherwise associated (e.g., communicatively coupled with) an autonomous vehicle and/or a robotic device.

Method 1300 can begin at block 1310, where the computing device can determine a mapping of an environment that tiles the environment using a plurality of cells, and the environment including an autonomous vehicle, the plurality of cells each having an environmental status, such as discussed herein at least in the context of MAPS, MST, and state ST of the ETM.

In some examples, determining the mapping of the environment can include determining a hierarchical mapping of the environment, and where the hierarchical mapping includes a plurality of levels with each level including one or more cells of the plurality of cells, and where the plurality of levels includes a highest level, such as discussed herein at least in the context of MAPS, MST, and state ST of the ETM.

In some of these examples, the plurality of levels can include a first level, a second level, and a third level, where the first level can include one or more first rows of cells and one or more first columns of cells, and where determining the hierarchical mapping of the environment can include: calculating a maximum number of first row cells over all of the one or more first rows of cells; calculating a first number of row cells and a second number of row cells based the maximum number of first row cells; determining at least a first coarse cell based on the first number of row cells and at least a second coarse cell that is based on the second number of row cells; such as discussed herein at least in the context of MAPS and MST. In other of these examples, determining at least the first coarse cell based on the first number of row cells and at least the second coarse cell that is based on the second number of row cells can include: calculating a first number of column cells and a second number of column cells based the maximum number of first column cells; determining at least a third coarse cell based on the first number of column cells and at least a fourth coarse cell that is based on the second number of column cells; and assigning the third coarse cell and the fourth coarse cell to the second level, such as discussed herein at least in the context of MAPS and MST.

At block 1320, while the autonomous vehicle is in the environment, the computing device can: receive status data from the autonomous vehicle, the status data at least related to a location of the autonomous vehicle and to obstacles at the location of the autonomous vehicle, update the environmental status for at least one cell based on the status data related to the location of the autonomous vehicle and to obstacles at the location of the autonomous vehicle, determine, for each cell of the plurality of cells, a value for the cell that is based on the environmental status of the cell, determine a waypoint of a coverage path that substantially covers at least a region in the environment, where the coverage path is based on the location of the autonomous vehicle, determine whether the waypoint of the coverage path is reachable from the location of the autonomous vehicle, after determining that the waypoint of the coverage path is reachable, send a command directing an autonomous vehicle to begin travel in the environment toward the waypoint of the coverage path, the command based on the mapping of the environment, and update the waypoint of the coverage path based on the status data, such as discussed herein at least in the context of MAPS, MST, and states ST and $CP^0$ of the ETM.

In some examples, determining, for each cell of the plurality of cells, the value for the cell that is based on the environmental status of the cell can include determining the environmental status of the cell based on a plurality of environmental status values, such as discussed herein at least in the context of MAPS, MST, and state ST of the ETM. In some of these examples, the plurality of environmental status values can include a first value associated with an environmental status related to an obstacle in a cell, a second value associated with an environmental status related to an explored cell, and a third plurality of values associated with an environmental status related to an unexplored cell, such as discussed herein at least in the context of potential surface $E^0(k)$, MAPS, MST, and state ST of the ETM. In other of these examples, the third plurality of values can be based on a potential function having a plurality of plateaus of values corresponding to a plurality of columns of the plurality of cells, such as discussed herein at least in the context of potential surface $E^O(k)$, MAPS, and state ST of the ETM. In even other of these examples, the plurality of plateaus of values can monotonically increase from a leftmost column to a rightmost column, such as discussed herein at least in the context of potential surface $E^O(k)$, MAPS, and state ST of the ETM.

In other examples, determining the waypoint of the coverage path that substantially covers the environment can include determining a waypoint of a coverage path that substantially covers at least the region in the environment and goes from left to right within the environment, such as discussed herein at least in the context of states ST and $CP^O$ of the ETM. In some of these examples, determining the waypoint of the coverage path that substantially covers the environment can include determining the waypoint of the coverage path using a potential function having a plurality of plateaus of values corresponding to a plurality of columns of the plurality of cells, such as discussed herein at least in the context of state WT of the ETM.

In other examples, sending the command directing the autonomous vehicle can include initializing each of the plurality of cells of the mapping with one or more values representing an unexplored state of the cell in the environment, such as discussed herein at least in the context of state $CP^O$ of the ETM. In some of these examples, determining the mapping of the environment can include determining a hierarchical mapping of the environment, the hierarchical mapping including a plurality of levels with each level including one or more cells of the plurality of cells, where the plurality of levels can include a first level and a second level, and where initializing each of the plurality of cells of the mapping with the one or more values representing an unexplored state of the cell in the environment can include: for each first cell in the first level: calculating a first value for the first cell using a potential function having a plurality of plateaus of values for the plurality of cells, and assigning the first cell to the first value; and initializing each cell in the second level to a second value, such as discussed herein at least in the context of state ST of the ETM.

In other examples, updating the waypoint of the coverage path based on the status data can include: determining a directly reachable set of cells associated with the location of the autonomous vehicle; determining whether the location of the autonomous vehicle is associated with a directly reachable cell in the directly reachable set of cells; after determining that the location of the autonomous vehicle is associated with a directly reachable cell in the directly reachable set of cells, determining whether one or more cells adjacent to the directly reachable cell are in the directly reachable set of cells; after determining that one or more cells adjacent to the directly reachable cell are in the directly reachable set of cells, selecting a waypoint-candidate cell from the one or more cells adjacent to the directly reachable cell are in the directly reachable set of cells; and updating the waypoint of the coverage path based on the waypoint-candidate cell, such as discussed herein at least in the context of state $CP^O$ of the ETM and Algorithm 1.

In other examples, updating the waypoint of the coverage path based on the status data can include: determining a directly reachable set of cells associated with the location of the autonomous vehicle; determining whether the location of the autonomous vehicle is associated with a directly reachable cell in the directly reachable set of cells; after determining that the location of the autonomous vehicle is associated with a directly reachable cell in the directly reachable set of cells, determining whether one or more cells adjacent to the directly reachable cell are not in the directly reachable set of cells; after determining that one or more cells adjacent to the directly reachable cell are not in the directly reachable set of cells, selecting a waypoint-candidate cell based on the location of the autonomous vehicle; and updating the waypoint of the coverage path based on the waypoint-candidate cell, such as discussed herein at least in the context of state $CP^O$ of the ETM and Algorithm 1.

In other examples, updating the waypoint of the coverage path based on the status data can include: determining a directly reachable set of cells associated with the location of the autonomous vehicle; determining whether the location of the autonomous vehicle is not associated with the directly reachable set of cells; after determining that the location of the autonomous vehicle is not associated with the directly reachable set of cells, determining whether the directly reachable set of cells is not empty; and after determining whether the directly reachable set of cells is not empty: determining a potential function value for each cell in the directly reachable set of cells, determining a maximum potential function value of the potential function values of the cells in the directly reachable set of cells, where the maximum potential function value corresponds to a potential function value for a particular cell in the directly reachable set of cells, and updating the waypoint of the coverage path based on the particular cell, such as discussed herein at least in the context of state $CP^O$ of the ETM and Algorithm 1.

In other examples, updating the waypoint of the coverage path based on the status data can include: determining a directly reachable set of cells associated with the location of the autonomous vehicle; determining whether the location of the autonomous vehicle is not associated with the directly reachable set of cells; after determining that the location of the autonomous vehicle is not associated with the directly reachable set of cells, determining whether the directly reachable set of cells is empty; after determining that the directly reachable set of cells is empty, determining whether a pre-computed waypoint is available; and after determining that the pre-computed waypoint is available, updating the waypoint of the coverage path based on the pre-computed waypoint, such as discussed herein at least in the context of state $CP^O$ of the ETM and Algorithm 1.

In other examples, the mapping of the environment can include a hierarchical mapping of the environment, the hierarchical mapping can include a plurality of levels, and each level can include one or more cells of the plurality of cells, the plurality of levels can include a first level and a second level; then, updating the waypoint of the coverage path based on the status data can include: determining a directly reachable set of cells of the first level associated with the location of the autonomous vehicle; determining whether the location of the autonomous vehicle is not associated with the directly reachable set of cells of the first level; after determining that the location of the autonomous vehicle is not associated with the directly reachable set of cells, determining whether the directly reachable set of cells of the first level is empty; after determining that the directly reachable set of cells of the first level is empty, determining whether a pre-computed waypoint is not available; and after determining that the pre-computed waypoint is not available, updating the waypoint of the coverage path based on the status data and the second level of the hierarchical mapping, such as discussed herein at least in the context of states $CP^O$-$CP^L$ of the ETM and Algorithm 1.

In some of these examples, updating the waypoint of the coverage path based on the status data and the second level of the hierarchical mapping can include: determining a neighborhood set of cells of the second level associated with the location of the autonomous vehicle; determining a potential function value for each cell in the neighborhood set of cells of the second level; determining whether at least one cell in the neighborhood set of cells of the second level has a potential function value associated with an unexplored cell; and after determining that at least one cell in the neighborhood set of cells of the second level has the potential function value associated with an unexplored cell: determining a maximum potential function value of the potential function values of the at least one cell in the neighborhood set of cells of the second level, where the maximum potential function value corresponds to a potential function value for a particular cell of the at least one cell in the neighborhood set of cells of the second level, and updating the waypoint of the coverage path based on the particular cell, such as discussed herein at least in the context of states $CP^0$-$CP^L$ of the ETM and Algorithm 1. In other of these examples, updating the waypoint of the coverage path based on the status data and the second level of the hierarchical mapping can include: determining a neighborhood set of cells of the second level associated with the location of the autonomous vehicle; determining a potential function value for each cell in the neighborhood set of cells of the second level; determining whether all cells in the neighborhood set of cells of the second level do not have a potential function value associated with an unexplored cell; and after determining that all cells in the neighborhood set of cells of the second level do not have the potential function value associated with an unexplored cell, determining whether the hierarchical mapping has at least one other level than the first level and the second level; and after determining that the hierarchical mapping has at least one other level than the first level and the second level, updating the waypoint of the coverage path based on the status data and the at least one other level than the first level and the second level of the hierarchical mapping, such as discussed herein at least in the context of states $CP^0$-$CP^L$ of the ETM and Algorithm 1.

In other of these examples, updating the waypoint of the coverage path based on the status data and the second level of the hierarchical mapping can include: determining a neighborhood set of cells of the second level associated with the location of the autonomous vehicle; determining a potential function value for each cell in the neighborhood set of cells of the second level; determining whether all cells in the neighborhood set of cells of the second level do not have a potential function value associated with an unexplored cell; and after determining that all cells in the neighborhood set of cells of the second level do not have the potential function value associated with an unexplored cell, determining whether the hierarchical mapping does not have at least one other level than the first level and the second level; and after determining that the hierarchical mapping does not have at least one other level than the first level and the second level, updating the waypoint of the coverage path to be a waypoint associated with a local extremum, such as discussed herein at least in the context of states $CP^0$-$CP^L$ of the ETM and Algorithm 1.

In other examples, sending the command to the autonomous vehicle directing the autonomous vehicle to begin travel in the environment toward the waypoint of the coverage path can include: determining whether the updated waypoint of the coverage path is not associated with a local extremum; and after determining that the updated waypoint of the coverage path is not associated with a local extremum, generating a command to move toward the updated waypoint of the coverage path, such as discussed herein at least in the context of state $CP^0$ of the ETM. In other examples, sending the command directing the autonomous vehicle to begin travel in the environment toward the waypoint of the coverage path can include: determining whether the updated waypoint of the coverage path is associated with a local extremum; and after determining that the updated waypoint of the coverage path is associated with the local extremum, generating a command to shut down the autonomous vehicle, such as discussed herein at least in the context of states $CP^0$-$CP^L$ and FN of the ETM and Algorithm 1.

In some examples, method 1300 can also include: after determining that the waypoint of the coverage path is not reachable, determining whether a waypoint associated with the highest level is reachable from the location of the autonomous vehicle; and after determining that the waypoint associated with the highest level is not reachable from the location of the autonomous vehicle, sending a command to shut down the autonomous vehicle, such as discussed herein at least in the context of at least states $CP^0$-$CP^L$ and FN of the ETM and Algorithm 1.

In other examples, method 1300 can also include: determining whether the updated waypoint of the coverage path is not associated with a local extremum; and after determining that the updated waypoint of the coverage path is not associated with a local extremum, generating a second command to move toward the updated waypoint of the coverage path.

In other examples, the computing device can be a component of and/or located on the autonomous vehicle.

Additional Example Embodiments

The following clauses are offered as further description of the disclosure.

Clause 1—A method, including: determining a mapping of an environment that tiles the environment using a plurality of cells, the environment including an autonomous vehicle, the plurality of cells each having an environmental status; and while the autonomous vehicle is in the environment: receiving status data from the autonomous vehicle, the status data at least related to a location of the autonomous vehicle and to obstacles at the location of the autonomous vehicle, updating the environment status for at least one cell based on the status data related to the location of the autonomous vehicle and to obstacles at the location of the autonomous vehicle, determining, for each cell of the plurality of cells, a value for the cell that is based on the environmental status of the cell, determining whether a waypoint of a coverage path that substantially covers at least a region in the environment, wherein the coverage path is based on the location of the autonomous vehicle, determining whether the waypoint of the coverage path is reachable from the location of the autonomous vehicle, after determining that the waypoint of the coverage path is reachable, sending a command directing the autonomous vehicle to begin travel in the environment toward the waypoint of the coverage path, the command based on the mapping of the environment, and updating the waypoint of the coverage path based on the status data.

Clause 2—The method of Clause 1, where determining the mapping of the environment includes determining a hierarchical mapping of the environment, the hierarchical mapping includes a plurality of levels with each level including one or more cells of the plurality of cells, and where the plurality of levels includes a highest level.

Clause 3—The method of Clause 2, further including: after determining that the waypoint of the coverage path is not reachable, determining whether a waypoint associated with the highest level is reachable from the location of the autonomous vehicle; and after determining that the waypoint associated with the highest level is not reachable from the location of the autonomous vehicle, sending a command to shut down the autonomous vehicle.

Clause 4—The method of either Clause 2 or Clause 3, where the plurality of levels includes a first level, a second level, and a third level, where the first level includes one or more first rows of cells and one or more first columns of cells, and where determining the hierarchical mapping of the environment includes: calculating a maximum number of first row cells over all of the one or more first rows of cells; calculating a first number of row cells and a second number of row cells based the maximum number of first row cells; determining at least a first coarse cell based on the first number of row cells and at least a second coarse cell that is based on the second number of row cells; and assigning the first coarse cell and the second coarse cell to the second level.

Clause 5—The method of Clause 4, where separating the one or more cells of the first level based on the second number of row cells into at least the first portion of cells and the second portion of cells includes: calculating a maximum number of first column cells over all of the one or more first columns of cells; calculating a first number of column cells and a second number of column cells based the maximum number of first column cells; determining at least a third coarse cell based on the first number of column cells and at least a fourth coarse cell that is based on the second number of column cells; and assigning the third coarse cell and the fourth coarse cell to the second level.

Clause 6—The method of any one of Clauses 1-5, where determining, for each cell of the plurality of cells, the value for the cell that is based on the environmental status of the cell includes determining the environmental status of the cell based on a plurality of environmental status values.

Clause 7—The method of Clause 6, where the plurality of environmental status values includes a first value associated with an environmental status related to an obstacle in a cell, a second value associated with an environmental status related to an explored cell, and a third plurality of values associated with an environmental status related to an unexplored cell.

Clause 8—The method of Clause 7, where the third plurality of values is based on a potential function having a plurality of plateaus of values corresponding to a plurality of columns of the plurality of cells.

Clause 9—The method of Clause 8, where the plurality of plateaus of values are monotonically increasing from a leftmost column to a rightmost column.

Clause 10—The method of any one of Clauses 1-9, where determining the waypoint of the coverage path that substantially covers the environment includes determining a waypoint of a coverage path that substantially covers at least the region in the environment and goes from left to right within the environment.

Clause 11—The method of any one of Clauses 1-10, where determining the waypoint of the coverage path that substantially covers the environment includes determining the waypoint of the coverage path using a potential function having a plurality of plateaus of values corresponding to a plurality of columns of the plurality of cells.

Clause 12—The method of any one of Clauses 1-11, where sending the command directing the autonomous vehicle includes initializing each of the plurality of cells of the mapping with one or more values representing an unexplored state of the cell in the environment.

Clause 13—The method of Clause 12, where determining the mapping of the environment includes determining a hierarchical mapping of the environment, the hierarchical mapping including a plurality of levels with each level including one or more cells of the plurality of cells, where the plurality of levels includes a first level and a second level, and where initializing each of the plurality of cells of the mapping with the one or more values representing an unexplored state of the cell in the environment includes: for each first cell in the first level: calculating a first value for the first cell using a potential function having a plurality of plateaus of values for the plurality of cells, and assigning the first cell to the first value; and initializing each cell in the second level to a second value.

Clause 14—The method of any one of Clauses 1-13, further including: determining a first-location cell of the plurality of cells associated with the location of the autonomous vehicle as indicated in the status data, and assigning the value of the first-location cell to a value associated with an explored cell.

Clause 15—The method of any one of Clauses 1-14, where updating the waypoint of the coverage path based on the status data includes: determining a directly reachable set of cells associated with the location of the autonomous vehicle; determining whether the location of the autonomous vehicle is associated with a directly reachable cell in the directly reachable set of cells; after determining that the location of the autonomous vehicle is associated with a directly reachable cell in the directly reachable set of cells, determining whether one or more cells adjacent to the directly reachable cell are in the directly reachable set of cells; after determining that one or more cells adjacent to the directly reachable cell are in the directly reachable set of cells, selecting a waypoint-candidate cell from the one or more cells adjacent to the directly reachable cell are in the directly reachable set of cells; and updating the waypoint of the coverage path based on the waypoint-candidate cell.

Clause 16—The method of any one of Clauses 1-15, where updating the waypoint of the coverage path based on the status data includes: determining a directly reachable set of cells associated with the location of the autonomous vehicle; determining whether the location of the autonomous vehicle is associated with a directly reachable cell in the directly reachable set of cells; after determining that the location of the autonomous vehicle is associated with a directly reachable cell in the directly reachable set of cells, determining whether one or more cells adjacent to the directly reachable cell are not in the directly reachable set of cells; after determining that one or more cells adjacent to the directly reachable cell are not in the directly reachable set of cells, selecting a waypoint-candidate cell based on the location of the autonomous vehicle; and updating the waypoint of the coverage path based on the waypoint-candidate cell.

Clause 17—The method of any one of Clauses 1-16, where updating the waypoint of the coverage path based on the status data includes: determining a directly reachable set of cells associated with the location of the autonomous vehicle; determining whether the location of the autonomous vehicle is not associated with the directly reachable set of cells; after determining that the location of the autonomous vehicle is not associated with the directly reachable set of cells, determining whether the directly reachable set of cells is not empty; and after determining whether the directly reachable set of cells is not empty: determining a potential function value for each cell in the directly reachable set of cells, determining a maximum potential function value of the potential function values of the cells in the directly reachable set of cells, where the maximum potential function value corresponds to a potential function value for a particular cell in the directly reachable set of cells, and updating the waypoint of the coverage path based on the particular cell.

Clause 18—The method of any one of Clauses 1-17, where updating the waypoint of the coverage path based on the status data includes: determining a directly reachable set of cells associated with the location of the autonomous vehicle; determining whether the location of the autonomous vehicle is not associated with the directly reachable set of cells; after determining that the location of the autonomous vehicle is not associated with the directly reachable set of cells, determining whether the directly reachable set of cells is empty; after determining that the directly reachable set of cells is empty, determining whether a pre-computed waypoint is available; and after determining that the pre-computed waypoint is available, updating the waypoint of the coverage path based on the pre-computed waypoint.

Clause 19—The method of any one of Clauses 1-18, where the mapping of the environment includes a hierarchical mapping of the environment, the hierarchical mapping including a plurality of levels, each level including one or more cells of the plurality of cells, where the plurality of levels includes a first level and a second level, and where updating the waypoint of the coverage path based on the status data includes: determining a directly reachable set of cells of the first level associated with the location of the autonomous vehicle; determining whether the location of the autonomous vehicle is not associated with the directly reachable set of cells of the first level; after determining that the location of the autonomous vehicle is not associated with the directly reachable set of cells, determining whether the directly reachable set of cells of the first level is empty; after determining that the directly reachable set of cells of the first level is empty, determining whether a pre-computed waypoint is not available; and after determining that the pre-computed waypoint is not available, updating the waypoint of the coverage path based on the status data and the second level of the hierarchical mapping.

Clause 20—The method of Clause 19, where updating the waypoint of the coverage path based on the status data and the second level of the hierarchical mapping includes: determining a neighborhood set of cells of the second level associated with the location of the autonomous vehicle; determining a potential function value for each cell in the neighborhood set of cells of the second level; determining whether at least one cell in the neighborhood set of cells of the second level has a potential function value associated with an unexplored cell; and after determining that at least one cell in the neighborhood set of cells of the second level has the potential function value associated with an unexplored cell: determining a maximum potential function value of the potential function values of the at least one cell in the neighborhood set of cells of the second level, where the maximum potential function value corresponds to a potential function value for a particular cell of the at least one cell in the neighborhood set of cells of the second level, and updating the waypoint of the coverage path based on the particular cell.

Clause 21—The method of Clause 20, where updating the waypoint of the coverage path based on the status data and the second level of the hierarchical mapping includes: determining a neighborhood set of cells of the second level associated with the location of the autonomous vehicle; determining a potential function value for each cell in the neighborhood set of cells of the second level; determining whether all cells in the neighborhood set of cells of the second level do not have a potential function value associated with an unexplored cell; and after determining that all cells in the neighborhood set of cells of the second level do not have the potential function value associated with an unexplored cell, determining whether the hierarchical mapping has at least one other level than the first level and the second level; and after determining that the hierarchical mapping has at least one other level than the first level and the second level, updating the waypoint of the coverage path based on the status data and the at least one other level than the first level and the second level of the hierarchical mapping.

Clause 22—The method of Clause 21, where updating the waypoint of the coverage path based on the status data and the second level of the hierarchical mapping includes: determining a neighborhood set of cells of the second level associated with the location of the autonomous vehicle; determining a potential function value for each cell in the neighborhood set of cells of the second level; determining whether all cells in the neighborhood set of cells of the second level do not have a potential function value associated with an unexplored cell; and after determining that all cells in the neighborhood set of cells of the second level do not have the potential function value associated with an unexplored cell, determining whether the hierarchical mapping does not have at least one other level than the first level and the second level; and after determining that the hierarchical mapping does not have at least one other level than the first level and the second level, updating the waypoint of the coverage path to be a waypoint associated with a local extremum.

Clause 23—The method of any one of Clauses 1-22, where sending the command directing the autonomous vehicle to begin travel in the environment toward the waypoint of the coverage path includes: determining whether the updated waypoint of the coverage path is not associated with a local extremum; and after determining that the updated waypoint of the coverage path is not associated with a local extremum, generating a command to move toward the updated waypoint of the coverage path.

Clause 24—The method of any one of Clauses 1-23, where sending the command directing the autonomous vehicle to begin travel in the environment toward the waypoint of the coverage path includes: determining whether the updated waypoint of the coverage path is associated with a local extremum; and after determining that the updated waypoint of the coverage path is associated with the local extremum, generating a command to shut down the autonomous vehicle.

Clause 25—A computing device, including: one or more processing units; and computer memory including at least computer-executable instructions stored thereon that, when executed by the one or more processing units, cause the computing device to perform functions including the method of any one of Clauses 1-24.

Clause 26—The computing device of Clause 25, where the data storage includes a non-transitory computer-readable medium.

Clause 27—The computing device of either Clause 25 or Clause 26, where the computing device is a component of the autonomous vehicle.

Clause 28—A computer-readable medium having stored thereon instructions, that when executed by one or more processing units of a computing device, cause the computing device to perform functions including the method of any one of Clauses 1-24.

Clause 29—The computing device of Clause 27, where the computer-readable medium includes a non-transitory computer readable medium.

Clause 30—An apparatus, including: means for performing the method of any one of Clauses 1-24.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

The invention claimed is:

1. A method, comprising:
   determining a hierarchical mapping of an environment that tiles the environment using a plurality of cells, the environment including an autonomous vehicle, the plurality of cells each having an environmental status, the hierarchical mapping including (i) a first level mapping having a plurality of potential values each corresponding to an environmental status of a respective cell of the plurality of cells, and (ii) a second level mapping having a plurality of potential values, wherein each potential value of the second level mapping represents an average of the potential values of a respective non-overlapping set of potential values of the first level mapping; and
   while the autonomous vehicle is in the environment:
      receiving status data from the autonomous vehicle, the status data at least related to a location of the autonomous vehicle and to obstacles at the location of the autonomous vehicle,
      updating the environmental status for a first cell of the plurality of cells based on the status data related to the location of the autonomous vehicle and to obstacles at the location of the autonomous vehicle,
      updating, based on the updated environmental status of the first cell, the first level mapping, wherein updating the first level mapping comprises updating a first potential value of the first level mapping that corresponds to the environmental status of the first cell,
      updating, based on the updated first level mapping, the second level mapping, wherein updating the second level mapping comprises updating a second potential value of the second level mapping, wherein the second potential value represents an average of a particular subset of potential values of the first level mapping that includes the first potential value; and
      determining a waypoint based on the location of the autonomous vehicle and the updated first level mapping.

2. The method of claim 1, wherein determining the waypoint based on the location of the autonomous vehicle and the updated first level mapping comprises:
   determining a directly reachable set of cells associated with the location of the autonomous vehicle;

determining that the directly reachable set of cells is not empty;

responsive to determining that the directly reachable set of cells is not empty, determining, based on potential values from the updated first level mapping for each cell in the directly reachable set of cells, that the location of the autonomous vehicle corresponds to a local extremum within the updated first level mapping; and responsive to determining that the location of the autonomous vehicle corresponds to a local extremum within the updated first level mapping, determining the waypoint based on the location of the autonomous vehicle and the updated second level mapping.

3. The method of claim 2, wherein the hierarchical mapping comprises one or more additional levels of mapping above the second level mapping, and wherein determining the waypoint based on the location of the autonomous vehicle and the updated second level mapping comprises:

determining that the location of the autonomous vehicle corresponds to a local extremum within the updated second level mapping;

responsive to determining that the location of the autonomous vehicle corresponds to a local extremum within the updated second level mapping, determining that the location of the autonomous vehicle corresponds to a local extremum within each additional level above the second level of mapping; and responsive to determining that the location of the autonomous vehicle corresponds to a local extremum within each additional level above the second level of mapping, sending a command to shut down the autonomous vehicle.

4. The method of claim 2, wherein the hierarchical mapping additionally includes a third level mapping having a plurality of potential values, wherein each potential value of the third level mapping represents an average of the potential values of a respective non-overlapping set of potential values of the second level mapping, wherein the method further includes updating, based on the updated second level mapping, the third level mapping, wherein updating the third level mapping comprises updating a third potential value of the third level mapping, wherein the third potential value represents an average of a subset of potential values of the second level mapping that includes the second potential value, and determining the waypoint based on the location of the autonomous vehicle and the updated second level mapping comprises:

determining that the location of the autonomous vehicle corresponds to a local extremum within the updated second level mapping; and responsive to determining that the location of the autonomous vehicle corresponds to a local extremum within the updated second level mapping, determining the waypoint based on the location of the autonomous vehicle and the updated third level mapping.

5. The method of claim 4, wherein determining the waypoint based on the location of the autonomous vehicle and the updated third level mapping comprises:

determining that the location of the autonomous vehicle corresponds to a local extremum within the updated third level mapping; and responsive to determining that the location of the autonomous vehicle corresponds to a local extremum within the third level of mapping, sending a command to shut down the autonomous vehicle.

6. The method of claim 1, wherein updating the second potential value comprises determining a mean of at least two potential values of the particular subset of potential values of the first level mapping that includes the first potential value.

7. The method of claim 6, wherein (i) a first subset of potential values of the first level mapping that correspond to a first subset of the plurality of cells of the mapping have one or more values that are indicative of an unexplored state of a cell in the environment, (ii) a second subset of potential values of the first level mapping that correspond to a second subset of the plurality of cells of the mapping have a value that is indicative of a forbidden and/or obstacle-containing state of a cell in the environment, and (iii) a third subset of potential values of the first level mapping that correspond to a third subset of the plurality of cells of the mapping have a value that is that is indicative of an explored state of a cell in the environment.

8. The method of claim 7, wherein the first subset of potential values exhibit a plurality of plateaus of values, wherein the plateaus of values are oriented along one of the rows or the columns of the plurality of cells.

9. The method of claim 7, wherein updating the second potential value additionally comprises determining a proportion of the particular subset of potential values that have values indicative of an unexplored state of a cell in the environment; and multiplying the determined proportion with the determined mean.

10. The method of claim 1, wherein a first subset of potential values of the first level mapping that correspond to a first subset of the plurality of cells of the mapping have one or more values that are indicative of an unexplored state of a cell in the environment, wherein a second subset of potential values of the first level mapping that correspond to a second subset of the plurality of cells of the mapping have a value that is indicative of a forbidden and/or obstacle-containing state of a cell in the environment, wherein a third subset of potential values of the first level mapping that correspond to a third subset of the plurality of cells of the mapping have a value that is that is indicative of an explored state of a cell in the environment, wherein the first, second, and third subsets of the plurality of cells are non-overlapping, wherein the value that is that is indicative of an explored state of a cell in the environment is greater than the value that is that is indicative of a forbidden and/or obstacle-containing state of a cell in the environment, and wherein the value that is that is indicative of an explored state of a cell in the environment is less than all of the one or more values that are indicative of an unexplored state of a cell in the environment.

11. The method of claim 1, wherein determining the hierarchical mapping of the environment comprises initializing potential values, of the first level mapping, that correspond to a first subset of the plurality of cells of the mapping with one or more values representing that are indicative of an unexplored state of a cell in the environment.

12. The method of claim 11, further comprising: initializing potential values, of the first level mapping, that correspond to the first subset of the plurality of cells of the mapping with plateaus of values that are indicative of an unexplored state of a cell in the environment, wherein the plateaus of values are oriented along one of the rows or the columns of the plurality of cells.

13. The method of claim 11, wherein determining the hierarchical mapping of the environment further comprises initializing potential values, of the first level mapping, that correspond to a second subset of the plurality of cells of the mapping with a value that is indicative of a forbidden and/or obstacle-containing state of a cell in the environment, wherein the second subset is non-overlapping with the first subset.

14. The method of claim 1, wherein updating the first potential value of the first level mapping that corresponds to the environmental status of the first cell comprises setting the first potential value to a value that is indicative of an explored state of a cell.

15. The method of claim 1, wherein determining the waypoint comprises:
 determining a directly reachable set of cells associated with the location of the autonomous vehicle;
 determining whether the location of the autonomous vehicle is associated with a directly reachable cell in the directly reachable set of cells;
 after determining that the location of the autonomous vehicle is associated with a directly reachable cell in the directly reachable set of cells, determining whether two cells located above and below the directly reachable cell are in the directly reachable set of cells;
 after determining that the two cells located above and below the directly reachable cell are in the directly reachable set of cells, selecting a waypoint-candidate cell from the two cells located above and below the directly reachable cell that are in the directly reachable set of cells; and
 updating the waypoint of the coverage path based on the waypoint-candidate cell.

16. The method of claim 1, wherein determining the waypoint comprises:
 determining a directly reachable set of cells associated with the location of the autonomous vehicle;
 determining whether the location of the autonomous vehicle is associated with a directly reachable cell in the directly reachable set of cells;
 after determining that the location of the autonomous vehicle is associated with a directly reachable cell in the directly reachable set of cells, determining whether two cells located above and below the directly reachable cell are in the directly reachable set of cells;
 after determining that the two cells located above and below the directly reachable cell are not in the directly reachable set of cells, selecting a waypoint-candidate cell based on the location of the autonomous vehicle; and
 determining the waypoint based on the waypoint-candidate cell.

17. The method of claim 1, wherein determining the waypoint comprises:
 determining a directly reachable set of cells associated with the location of the autonomous vehicle;
 determining whether the location of the autonomous vehicle is not associated with the directly reachable set of cells;
 after determining that the location of the autonomous vehicle is not associated with the directly reachable set of cells, determining whether the directly reachable set of cells is not empty; and
 after determining whether the directly reachable set of cells is not empty:
  determining a potential value from the updated first level mapping for each cell in the directly reachable set of cells,
  determining a maximum potential value of the potential values of the cells in the directly reachable set of cells, wherein the maximum potential value corresponds to a potential value for a particular cell in the directly reachable set of cells, and
  determining the waypoint based on the particular cell.

18. The method of claim 1, wherein determining the waypoint comprises:
 determining a directly reachable set of cells associated with the location of the autonomous vehicle;
 determining whether the location of the autonomous vehicle is not associated with the directly reachable set of cells;
 after determining that the location of the autonomous vehicle is not associated with the directly reachable set of cells, determining whether the directly reachable set of cells is empty;
 after determining that the directly reachable set of cells is empty, determining whether a pre-computed waypoint is available; and
 after determining that the pre-computed waypoint is available, determining the waypoint based on the pre-computed waypoint.

19. A computing device, comprising:
 one or more processing units; and
 a non-transitory computer-readable medium storing at least computer-executable instructions that, when executed by the one or more processing units, cause the computing device to perform functions comprising:
  determining a hierarchical mapping of an environment that tiles the environment using a plurality of cells, the environment including an autonomous vehicle, the plurality of cells each having an environmental status, the hierarchical mapping including (i) a first level mapping having a plurality of potential values each corresponding to an environmental status of a respective cell of the plurality of cells, and (ii) a second level mapping having a plurality of potential values, wherein each potential value of the second level mapping represents an average of the potential values of a respective non-overlapping set of potential values of the first level mapping; and
  while the autonomous vehicle is in the environment:
   receiving status data from the autonomous vehicle, the status data at least related to a location of the autonomous vehicle and to obstacles at the location of the autonomous vehicle,
   updating the environmental status for a first cell of the plurality of cells based on the status data related to the location of the autonomous vehicle and to obstacles at the location of the autonomous vehicle,
   updating, based on the updated environmental status of the first cell, the first level mapping, wherein updating the first level mapping comprises updating a first potential value of the first level mapping that corresponds to the environmental status of the first cell,
   updating, based on the updated first level mapping, the second level mapping, wherein updating the second level mapping comprises updating a second potential value level mapping, wherein the second potential value represents an average of a particular subset of potential values of the first level mapping that includes the first potential value; and determining a waypoint based on the location of the autonomous vehicle and the updated first level mapping.

20. A non-transitory computer-readable medium storing at least computer-executable instructions that, when executed by one or more processing units of a computing device, cause the computing device to perform functions comprising:

determining a hierarchical mapping of an environment that tiles the environment using a plurality of cells, the environment including an autonomous vehicle, the plurality of cells each having an environmental status, the hierarchical mapping including (i) a first level mapping having a plurality of potential values each corresponding to an environmental status of a respective cell of the plurality of cells, and (ii) a second level mapping having a plurality of potential values, wherein each potential value of the second level mapping represents an average of the potential values of a respective non-overlapping set of potential values of the first level mapping; and while the autonomous vehicle is in the environment:

receiving status data from the autonomous vehicle, the status data at least related to a location of the autonomous vehicle and to obstacles at the location of the autonomous vehicle, updating the environmental status for a first cell of the plurality of cells based on the status data related to the location of the autonomous vehicle and to obstacles at the location of the autonomous vehicle, updating, based on the updated environmental status of the first cell, the first level mapping, wherein updating the first level mapping comprises updating a first potential value of the first level mapping that corresponds to the environmental status of the first cell, updating, based on the updated first level mapping, the second level mapping, wherein updating the second level mapping comprises updating a second potential value of the second level mapping, wherein the second potential value that represents an average of a particular subset of potential values of the first level mapping that includes the first potential value; and determining a waypoint based on the location of the autonomous vehicle and the updated first level mapping.

* * * * *